US012760190B2

(12) United States Patent
Lei et al.

(10) Patent No.: US 12,760,190 B2
(45) Date of Patent: Oct. 13, 2026

(54) COATING COMPOSITION, ITS PREPARATION AND USE IN REDUCING HEAT GAIN

(71) Applicant: City University of Hong Kong, Kowloon (HK)

(72) Inventors: Dangyuan Lei, Kowloon (HK); Xue Ma, Kowloon (HK); Yang Fu, Kowloon (HK)

(73) Assignee: City University of Hong Kong, Kowloon (HK)

( * ) Notice: Subject to any disclaimer, the term of this patent is extended or adjusted under 35 U.S.C. 154(b) by 614 days.

(21) Appl. No.: 18/061,624

(22) Filed: Dec. 5, 2022

(65) Prior Publication Data

US 2024/0182727 A1 Jun. 6, 2024

(51) Int. Cl.

| | |
|---|---|
| ***C09D 7/40*** | (2018.01) |
| ***C08K 3/40*** | (2006.01) |
| ***C08K 7/20*** | (2006.01) |
| ***C09D 5/18*** | (2006.01) |
| ***C09D 7/61*** | (2018.01) |
| ***C09K 11/77*** | (2006.01) |
| *C08K 3/22* | (2006.01) |

(52) U.S. Cl.

CPC .................. *C09D 7/70* (2018.01); *C08K 3/40* (2013.01); *C08K 7/20* (2013.01); *C09D 5/18* (2013.01); *C09D 7/61* (2018.01); *C09K 11/7734* (2013.01); *C08K 2003/2241* (2013.01); *C08K 2201/005* (2013.01); *C09D 7/66* (2018.01)

(58) Field of Classification Search

CPC . C09D 5/00; C09D 5/004; C09D 5/18; C09D 7/61; C09D 7/66; C09D 7/70; C08K 3/40; C08K 7/20; C08K 2003/2241; C08K 2201/005; C09K 11/7734

See application file for complete search history.

(56) References Cited

U.S. PATENT DOCUMENTS

| | | | | |
|---|---|---|---|---|
| 2021/0131708 | A1 * | 5/2021 | Dai | C08K 3/013 |
| 2023/0116730 | A1 * | 4/2023 | Meckler | C09D 5/004 428/690 |

FOREIGN PATENT DOCUMENTS

| | | | | |
|---|---|---|---|---|
| CN | 101560392 B | * 10/2012 | | |
| CN | 114605875 A | * 6/2022 | | C09D 131/04 |
| WO | WO-2019060492 A1 | * 3/2019 | | C03C 11/002 |
| WO | 2021083250 A1 | 5/2021 | | |

OTHER PUBLICATIONS

Machine Translation of CN-101560392-B (Year: 2012).*

(Continued)

*Primary Examiner* — Amber R Orlando
*Assistant Examiner* — Sarah Catherine Case
(74) *Attorney, Agent, or Firm* — Renner, Kenner, Greive, Bobak, Taylor & Weber

(57) ABSTRACT

A coating composition for reducing heat gain of an article includes $TiO_2$ particles; hollow glass microspheres; a phosphor material having a quantum yield of at least about 90% and an excitation wavelength from about 250 nm to about 440 nm, matching those of the $TiO_2$ particles; and a polymer. Also a method for reducing heat gain of an article by using the coating composition of the present invention.

14 Claims, 37 Drawing Sheets
(3 of 37 Drawing Sheet(s) Filed in Color)

(56) References Cited

OTHER PUBLICATIONS

Machine Translation of CN-114605875-A (Year: 2022).*
Ma, et al., "Effects of Stokes shift and Purcell enhancement on fluorescence-assisted radiative cooling", Journal of Materials Chemistry A. (Year: 2022).*
"Ti-Pure Titanium Dioxide Product Overview", Chemours, p. 17 <https://www.tipure.com/en/-/media/files/tipure/legacy/titanium-dioxide-for-coatings.pdf>. (Year: 2019).*
X. Xue, M. Qiu, Y. Li, Q. M. Zhang, S. Li, Z. Yang, C. Feng, W. Zhang, J.-G. Dai, D. Lei, W. Jin, L. Xu, T. Zhang, J. Qin, H. Wang, S. Fan, Adv. Mater. 2020, 1906751-1906751.
X. Ma, Y. Fu, A. Portniagin, N. Yang, D. Liu, A L. Rogach, J.-G. Dai, D. Lei, J. Mater. Chem. A, 2022,10, 19635-19640.
B. I. Cook, J. E. Smerdon, R. Seager and S. Coats, Clim. Dyn., 2014, 43, 2607-2627.
D. Zhao, A. Aili, Y. Zhai, S. Xu, G. Tan, X. Yin and R. Yang, Appl. Phys. Rev., 2019, 6, 021306.
J. Mandal, Y. Yang, N. Yu and A. P. Raman, Joule, 2020, 4, 1350-1356.
J. A. Reagan and D. Acklam, Energy Build., 1979, 2, 237-248.
C. Granqvist and A. Hjortsberg, J. Appl. Phys., 1981, 52, 4205-4220.
S. Fan and W. Li, Nat. Photonics, 2022, 1-9.
X. Yin, R. Yang, G. Tan and S. Fan, Science, 2020, 370, 786-791.
A. P. Raman, M. A. Anoma, L. Zhu, E. Rephaeli and S. Fan, Nature, 2014, 515, 540-544.
D. Chae, M. Kim, P.-H. Jung, S. Son, J. Seo, Y. Liu, B. J. Lee and H. Lee, ACS Appl. Mater. Interfaces, 2020, 12, 8073-8081.
H. Ma, K. Yao, S. Dou, M. Xiao, M. Dai, L. Wang, H. Zhao, J. Zhao, Y. Li and Y. Zhan, Sol. Energy Mater. Sol. Cells, 2020, 212, 110584.
Y. Fu, J. Yang, Y. Su, W. Du and Y. Ma, Sol. Energy Mater. Sol. Cells, 2019, 191, 50-54.
Y. Zhai, Y. Ma, S. N. David, D. Zhao, R. Lou, G. Tan, R. Yang and X. Yin, Science, 2017, 355, 1062-1066.
C. Zou, G. Ren, M. M. Hossain, S. Nirantar, W. Withayachumnankul, T. Ahmed, M. Bhaskaran, S. Sriram, M. Gu and C. Fumeaux, Adv. Opt. Mater., 2017, 5, 1700460.
S. Jeong, C. Y. Tso, Y. M. Wong, C. Y. Chao and B. Huang, Sol. Energy Mater. Sol. Cells, 2020, 206, 110296.
H. Zhang, K. C. Ly, X. Liu, Z. Chen, M. Yan, Z. Wu, X. Wang, Y. Zheng, H. Zhou and T. Fan, Proc. Natl. Acad. Sci. U. S. A., 2020, 117, 14657-14666.
S.-Y. Heo, G. J. Lee, D. H. Kim, Y. J. Kim, S. Ishii, M. S. Kim, T. J. Seok, B. J. Lee, H. Lee and Y. M. Song, Sci. Adv., 2020, 6, eabb1906.
J. Mandal, Y. Fu, A. C. Overvig, M. Jia, K. Sun, N. N. Shi, H. Zhou, X. Xiao, N. Yu and Y. Yang, Science, 2018, 362, 315-319.
T. Wang, Y. Wu, L. Shi, X. Hu, M. Chen and L. Wu, Nat. Commun., 2021, 12, 1-11.
D. Li, X. Liu, W. Li, Z. Lin, B. Zhu, Z. Li, J. Li, B. Li, S. Fan and J. Xie, Nat. Nanotechnol., 2021, 16, 153-158.
A. Leroy, B. Bhatia, C. C. Kelsall, A. Castillejo-Cuberos, M. Di Capua H, L. Zhao, L. Zhang, A. Guzman and E. Wang, Sci. Adv., 2019, 5, eaat9480.
X. Li, J. Peoples, Z. Huang, Z. Zhao, J. Qiu and X. Ruan, Cell Rep. Phys. Sci., 2020, 1, 100221.
X. Li, J. Peoples, P. Yao and X. Ruan, ACS Appl. Mater. Interfaces, 2021, 13, 21733-21739.
Y. Liu, A. Bai, Z. Fang, Y. Ni, C. Lu and Z. Xu, Materials, 2019, 12, 1208.
Y. Chen, B. Dang, J. Fu, C. Wang, C. Li, Q. Sun and H. Li, Nano Lett., 2020, 21, 397-404.
Y. Fu, Y. An, Y. Xu, J. G. Dai and D. Lei, EcoMat, 2022, 4, e12169.
S. Son, S. Jeon, D. Chae, S. Y. Lee, Y. Liu, H. Lim, S. J. Oh and H. Lee, Nano Energy, 2021, 79, 105461.
S. Jeon, S. Son, S. Y. Lee, D. Chae, J. H. Bae, H. Lee and S. J. Oh, ACS Appl. Mater. Interfaces, 2020, 12, 54763-54772.
R. A. Yalçn, E. Blandre, K. Joulain and J. Dr'evillon, J. Photonics Energy, 2021, 11, 032104.
P. Berdahl, S. S. Chen, H. Destaillats, T. W. Kirchstetter, R. M. Levinson and M. A. Zalich, Sol. Energy Mater. Sol. Cells, 2016, 157, 312-317.
B. Romeira and A. Fiore, IEEE J. Quantum Electron., 2018, 54, 1-12.
Z. Huang and X. Ruan, Int. J. Heat Mass Transfer, 2017, 104, 890-896.
J. Peoples, X. Li, Y. Lv, J. Qiu, Z. Huang and X. Ruan, Int. J. Heat Mass Transfer, 2019, 131, 487-494.
Y. Tanaka, G. Obara, A. Zenidaka, N. N. Nedyalkov, M. Terakawa and M. Obara, Opt. Express, 2010, 18, 27226-27237.
D. Englund, A. Faraon, I. Fushman, N. Stoltz, P. Petroffand J. Vu ckovic, Nature, 2007, 450, 857-861.
Y. Yamamoto, S. Machida and G. Bjork, Phys. Rev. A: At., Mol., Opt. Phys., 1991, 44, 657.
R. Levinson, S. Chen, C. Ferrari, P. Berdahl and J. Slack, Energy Build., 2017, 152, 752-765.
Yalçn, R. A., Blandre, E., Joulain, K., & Drevillon, J. (2020). Colored radiative cooling coatings with nanoparticles. ACS Photonics, 7(5), 1312-1322.
Fu, Y., An, Y., Xu, Y., Dai, J. G., & Lei, D. (2022). Polymer coating with gradient-dispersed dielectric nanoparticles for enhanced daytime radiative cooling. EcoMat, 4(2), e12169.
Yu, Xinxian, et al. Review of radiative cooling materials: performance evaluation and design approaches. Nano Energy 88 (2021): 106259.

* cited by examiner

| Phosphor | BAM | S541 | $SrAl_2O_4:Eu^{2+},Dy^{3+},Yb^{3+}$ |
|---|---|---|---|
| Excitation peak (nm) | 333 | 341 | 420 |
| Emission peak (nm) | 463 | 539 | 525 |
| Stokes shift (nm) | 130 | 198 | 105 |
| Quantum yield (%) | 90 | 90 | 64 |
| Purcell factor | 2.6 | 1.3 | 1.4 |
| Max ESR improvement (%) | 4 | -1% | 3.6% |

Fig. 4

| Sample | $\tau_1$ (ns) | $\tau_2$ (ns) |
|---|---|---|
| Pure BAM | 387 | 1152 |
| BAM-2g in coating | 11 | 446 |
| Pure S541 | 264 | 819 |
| S541-2g in coating | 177 | 627 |

Fig. 6C

| Component | Density ($g/cm^3$) | Weight (g) in fluorescent coating | Volume fraction (%) in fluorescent coating | Weight (g) in white coating | Volume fraction (%) in white coating |
|---|---|---|---|---|---|
| Polymer matrix (dried) | 0.85 | 20 | 43.0 | 10 | 44.2 |
| $TiO_2$ NPs | 4.23 | 12 | 10.4 | 12 | 10.7 |
| Phosphor microparticles (BAM) | 3.44 | 2 | 2.8 | 0 | 0 |
| Hollow glass spheres | 0.25 | 3 | 43.8 | 3 | 45.1 |

Fig. 10

| Reference sample No. | UV reflectance | Visible reflectance | Near-infrared reflectance | Solar reflectance |
|---|---|---|---|---|
| 1 | 0.0968 | 0.9258 | 0.8946 | 0.8796 |
| 2 | 0.0973 | 0.7868 | 0.7488 | 0.7426 |
| 3 | 0.0938 | 0.5800 | 0.5378 | 0.5412 |
| 4 | 0.0957 | 0.4609 | 0.4318 | 0.4331 |
| 5 | 0.0962 | 0.3149 | 0.3194 | 0.3089 |
| 6 | 0.0843 | 0.0817 | 0.1487 | 0.1145 |

Fig. 20B

| Time | BAM-2g | BAM-4g | BAM-6g | S541-2g | S541-4g | S541-6g |
|---|---|---|---|---|---|---|
| 11:23 | 0.8835 | 0.8133 | 0.8002 | 0.8440 | 0.8440 | 0.8309 |
| 11:56 | 0.9052 | 0.8318 | 0.8202 | 0.8665 | 0.8704 | 0.8511 |
| 12:32 | 0.8842 | 0.8199 | 0.8123 | 0.8502 | 0.8539 | 0.8426 |
| 12:55 | 0.8920 | 0.8274 | 0.8202 | 0.8561 | 0.8597 | 0.8489 |
| 13:13 | 0.8998 | 0.8362 | 0.8100 | 0.8586 | 0.8736 | 0.8474 |
| 13:43 | 0.8958 | 0.8352 | 0.8069 | 0.8554 | 0.8635 | 0.8433 |
| 14:16 | 0.9148 | 0.8327 | 0.8154 | 0.8543 | 0.8673 | 0.8413 |
| 14:51 | 0.8964 | 0.8327 | 0.8284 | 0.8582 | 0.8624 | 0.8454 |
| 15:08 | 0.9198 | 0.8140 | 0.7973 | 0.8363 | 0.8418 | 0.8251 |

Fig. 22C

COATING COMPOSITION, ITS PREPARATION AND USE IN REDUCING HEAT GAIN

FIELD OF THE INVENTION

The present invention relates to a novel coating composition particularly but not exclusive to a passive radiative cooling coating composition. The present invention also relates to the preparation of the coating composition as well as the use of it in reducing heat gain of an article, in particular, but not exclusive to an infrastructure.

BACKGROUND

The excessive energy consumption for cooling buildings, in particular, during hot weather, aggravates the global energy crisis and the greenhouse effect. It is believed that passive daytime radiative cooling is one of the promising alternatives to the conventional air conditioning. These passive radiative cooling materials generally can emit thermal radiation to the extremely cold outer space at a temperature of 3 K (−270° C.) through the atmospheric window (8 μm to 13 μm) and have high reflectance in the highly intensive solar spectrum (0.3 μm to 2.5 μm) as well as high emissivity in the mid- and even far-infrared regions.

Examples of such kind of materials may include photonic structures, metamaterals, porous structures, noble metal mirror, etc. However, these materials either require sophisticated fabrication or hazardous chemical processes. Also, these materials could generally achieve a cooling temperature of not more than about 6.0° C. under direct sunlight. All the above properties have greatly limited their practical applications.

There thus exists a need for improved coating materials that address or overcome at least some of the aforementioned challenges.

SUMMARY OF THE INVENTION

In a first aspect of the present invention, there is provided a coating composition for reducing heat gain of an article, comprising:

$TiO_2$ particles;

hollow glass microspheres;

a phosphor material having a quantum yield of at least about 90% and an excitation wavelength from about 250 nm to about 440 nm, matching those of the $TiO_2$ particles; and a polymer.

Preferably, the phosphor material comprises an alkali metal-containing material or an alkaline earth metal-containing material, doped with at least one rare earth metal.

It is preferred that the phosphor material comprises a general formula of:

MX:Ln with

M being selected from the group consisting of Li, Na, K, Mg, Ca, Sr, Mg, Al, and a combination thereof;

X being selected from an aluminate, a silicate, a phosphate, a nitride, a halogen, and a combination thereof; and Ln being a lanthanide selected from the group consisting of Eu, Dy, and a combination thereof.

Preferably, the phosphor material is selected from the group consisting of $BaMgAl_{10}O_{17}$:Ln, (Sr, Ba)$SiO_4$:Ln, $Sr_2MgSi_2O_7$:Ln, $LiBaPO_4$:Ln, $KMgPO_4$:Ln, $NaCaPO_4$:Ln, $Cas(PO_4)_3Cl$:Ln, $Li_2Ba_{0.99}SiO_4$:Ln, $Li_2Ca_{0.99}SiO_4$:Ln, $Sr_{0.9}Ca_{0.1}Al_2O_4$:Ln, $SrSi_2O_2N_2$:Ln, $CaSi_2O_2N_2$:Ln, $Ba_3Si_6O_{12}N_2$:Ln, $Ba_{2.56}Sr_{0.44}Si_6O_{12}N_2$:Ln, $Ba_2SrSi_6O_{12}N_2$:Ln and a combination thereof, with Ln as defined above.

In a preferred embodiment, the phosphor material is $BaMgAl_{10}O_{17}:Eu^{2+}$.

It is preferred that the phosphor material has a particle size of about 8 μm to about 15 μm.

It is preferred that the phosphor material has a weight percentage of about 4% wt to about 8% wt with respect to the coating composition.

Preferably, the $TiO_2$ particles comprise a rutile crystal structure, an anatase crystal structure, or a mixture thereof. Optionally, the $TiO_2$ particles has a particle size of about 200 nm to about 300 nm.

Preferably, the hollow glass microspheres comprises a coating selected from the group consisting of silver, nickel, zinc(II) oxide, $TiO_2$ with the anatase form, $TiO_2$ with the rutile form, and a combination thereof. Optionally, the hollow glass microspheres have a particle size of about 50 μm to about 60 μm.

Preferably, the polymer matrix comprises polystyrene, polyacrylate, polyalkylacrylate, polymethacrylate, polyalkylmethacrylate, polycarbonate, polyacryclic acid, polymethacrylic acid, and mixtures thereof, and copolymers thereof.

In a preferred embodiment, the polymer matrix is polystyrene acrylic emulsion polymer.

Preferably, the polymer matrix has a weight percentage of about 45% wt to about 60% wt with respect to the coating composition.

In a preferred embodiment, the coating composition, when applied on the article, reduces the heat gain of the article by at least about 15° C.

In a preferred embodiment, the coating composition has Purcell factor of about 1.3 to about 2.6.

In an embodiment, the coating composition has an infrared emissivity of at least about 0.9 at about 8 μm to about 13 μm.

In a preferred embodiment, the coating composition has an enhanced net cooling power by about 28 $W/m^2$ caused by the presence of phosphor material.

Preferably, the article comprises infrastructure, clothing, and automobile.

It is preferred that the coating composition further comprises a wetting agent, a dispersant agent, an antifoaming agent, a suspending agent, a levelling agent, a film-forming agent, water, or a mixture thereof.

In a second aspect of the present invention, there is provided a method for reducing heat gain of an article by using the coating composition in the first aspect, comprising the steps of:

a) providing a mixture comprising the coating composition as claimed in claim 1 and one or more of additives; and b) applying the mixture on the surface of article thereby forming a layer of coating thereon.

Preferably, the one or more of additives comprises a wetting agent, a dispersant agent, an antifoaming agent, a suspending agent, a levelling agent, a film-forming agent, water, or a mixture thereof.

It is preferred that step b) comprises the step of spraying the mixture on the surface of article at a predefined pressure. Optionally, the predefined pressure is about 4 MPa to about 10 MPa.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 4 is a table showing the comparison of different properties of three phosphors.

FIG. 6C is a table showing the fitted data corresponding to FIGS. 6A and 6B.

FIG. 10 is a table showing the density, weight, and volume fractions of the main components in the FERC coating and the white coating.

FIG. 20B is a table showing the UV, visible light, near infrared, and solar reflectance of the six reference samples in FIG. 19.

FIG. 22C is a table showing the fitted ESR data of the six FERC coatings with different phosphors of different concentrations in FIG. 22A.

DESCRIPTION OF THE PREFERRED EMBODIMENTS

Unless otherwise specifically provided, all tests herein are conducted at standard conditions which include a room and testing temperature of 25° C., sea level (1 atm.) pressure, pH 7, and all measurements are made in metric units. Further-more, all percentages, ratios, etc. herein are by weight, unless specifically indicated otherwise. It is understood that unless otherwise specifically noted, the materials compounds, chemicals, etc. described herein are typically commodity items and/or industry-standard items available from a variety of suppliers worldwide.

Unless otherwise defined, all technical terms used herein have the same meaning as commonly understood by one skilled in the art to which the invention belongs.

As used herein, the forms “a”, “an”, and “the” are intended to include the singular and plural forms unless the context clearly indicates otherwise.

As used in this application, the term “or” is intended to mean an inclusive “or” rather than an exclusive “or”. That is, unless specified otherwise, or clear from context, “X employs A or B” is intended to mean any of the natural inclusive permutations. That is, if X employs A; X employs B; or X employs both A and B, then “X employs A or B” is satisfied under any of the foregoing instances.

It is believed that polymer coatings based on matrix-filler composites exhibit several features that make them suitable for scalable passive radiative cooling applications, including, for example, cost effectiveness, ease in production and good durability, etc.

Figure 1:
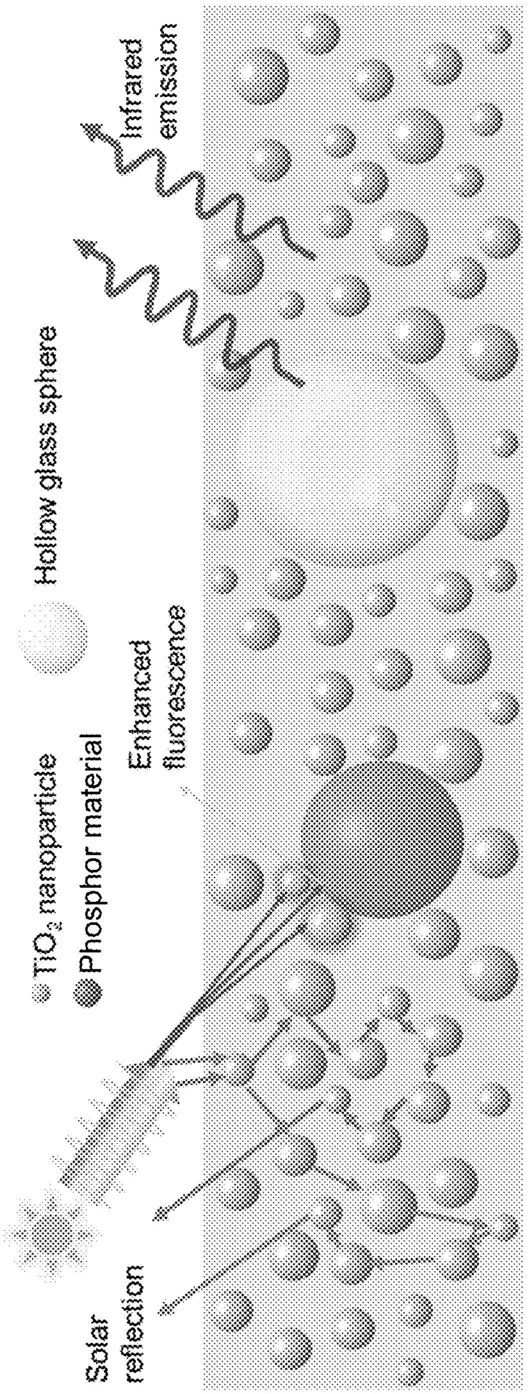
FIG. 1 shows a schematic diagram illustrating the cooling mechanism of a typical passive radiative cooling coating.

As illustrated in FIG. 1, the primary radiative heat dissipation originates from the polymer matrix and the hollow glass microspheres. In particular, the rich vibrational modes of the functional groups of the polymer matrix, such as C—H, C—O, and C═O, enables near unit emissivity at the atmospheric window at about 8 μm to about 13 μm (i.e. infrared (IR) radiation). Meanwhile, the hollow glass microspheres may enhance the above IR radiation by way of surface phonon-polariton resonance.

To achieve daytime cooling effect, the polymer matrix is preferred to have a transparent appearance to avoid solar absorption but allow the sunlight to pass through and be reflected by $TiO_2$ nanoparticles (also known as white pigment or white coating) through multiple Mie scattering. However, as a result of the intrinsic UV absorption of $TiO_2$, the solar reflectance of the coating is much hindered to be below 90% in general. It is believed that by incorporating a phosphor material to compete with $TiO_2$ nanoparticles for UV absorption and converting the absorbed UV light to be reemitted as visible light, it may therefore improve the retarded solar reflectance as well as the cooling effect of the coating.

Without intending to be limited by theory, the inventors have, through their own researches, trials, and experiments, devised that it would require the phosphor material(s) to have a high quantum yield (e.g. about 90% or more) and an excitation spectrum range that substantially matches the absorption spectrum range of $TiO_2$, i.e., about 250 nm to about 440 nm, to maximize the cooling effect of the coating. In an example embodiment, the coating as described herein may reduce the heat gain of an article with the coating thereon by at least 15° C.

According to the invention, there is provided a coating composition for reducing heat gain of an article, comprising:

$TiO_2$ particles;

hollow glass microspheres;

a phosphor material having a quantum yield of at least about 90% and an excitation wavelength from about 250 nm to about 440 nm, matching those of the $TiO_2$ particles; and a polymer.

The term “heat gain” generally denotes the transfer of heat from a source to a medium/article absorbing the heat generated by the source, leading to a rise of temperature of such medium after some time of exposure to the source. For example, when the source is sun or solar radiation, the medium/article that is exposed to the source, as long as it can absorb heat by way of conduction, radiation, infiltration, etc., it will lead to a rise of temperature of such medium/article after which is exposed to the sun or solar radiation for some time.

The phrase “reducing heat gain” means that the ability of the coating/coating composition to minimize the heat gain of a heat-absorbing medium, particularly to minimize the heat gain in a passive manner. Such ability may be measured in terms of one or more of, with the coating/coating composition applied onto the medium, the amount of temperature reduced, the net cooling power enhanced with respect to $TiO_2$ white coating, effective solar reflectance (ESR), etc.

The phrase “passive” as used herein means that the coating/coating composition does not require external power to operate or power consumption to achieve the heat gain reduction, but achieving as such via solar reflection and/or thermal emission to the outer space through the atmosphere’s longwave infrared (LWIR) transparency window (8-13 μm) during the daytime.

Turning to the coating composition, the composition includes a combination of $TiO_2$ particles, hollow glass microspheres, a phosphor material, and a polymer. The phosphor material is preferred to have a high quantum yield and an excitation wavelength matching the absorption spectrum of $TiO_2$. The term “quantum yield” denotes the ratio of the number of photons emitted to the number of photons absorbed. That said, for a predefined number of photons absorbed by the phosphor material, the more the photons emitted, the higher the quantum yield is;

or in other words, the high the quantum yield, the more the absorbed photons are emitted by the phosphor material. It is preferred that the phosphor material to have a quantum yield of at least about 90%, at least about 89.5%, at least about 89%, at least about 90.5%, at least about 90.1%, about 90% to about 99%, about 90.1% to about 98.5%, about 89.5% to about 99%. In an example embodiment, the phosphor material may have a quantum yield of about 90%.

It is believed that with a high quantum yield, more or even most of the absorbed UV light could be emitted as visible light to the outer space and therefore minimizing the chance of trapping and converting the absorbed (UV) energy into heat, thereby enhancing the ability of the coating/coating composition to present heat gain.

The excitation spectrum or excitation wavelengths of the phosphor material is/are preferably to be about 250 nm to about 440 nm. It is believed that by matching with the absorption spectrum of $TiO_2$, it would maximize the ability of the phosphor material to compete with $TiO_2$ for UV and therefore minimizing the amount of UV absorbed by $TiO_2$ and therefore the heat trapped by $TiO_2$ as such. As a result, the overall heat gain reduction ability of the coating/coating composition is enhanced. In an example embodiment, the coating composition may have an enhanced net cooling power by about 28 $W/m^2$ caused by the presence of phosphor material.

The phosphor material may comprise an alkali metal-containing material or an alkaline earth metal-containing material, doped with at least one rare earth metal. Examples of alkali metals may include Li, Na, K and the like. Examples of alkaline earth metals may include Be, Mg, Ca, Sr, Ba and the like. The rare earth metal may include Eu, Ce, Dy, Er, Gd, Sm, Tb, Nd, Pr, La, Ho, Yb, Lu, and the like. The rare earth metal may be in the +1, +2, or +3 oxidation state.

In an embodiment, the phosphor material comprises a general formula of:

MX:Ln with

M being selected from the group consisting of Li, Na, K, Mg, Ca, Sr, Mg, Al, and a combination thereof;

X being selected from an aluminate, a silicate, a phosphate, a nitride, a halogen, and a combination thereof; and Ln being a lanthanide selected from the group consisting of Eu, Dy, and a combination thereof.

In particular, the phosphor material may be selected from the group consisting of $BaMgAl_{10}O_{17}$:Ln, (Sr, Ba)$SiO_4$:Ln, $Sr_2MgSi_2O_7$:Ln, $LiBaPO_4$:Ln, $KMgPO_4$:Ln, $NaCaPO_4$:Ln, $Cas(PO_4)_3Cl$:Ln, $LizBa_{0.99}SiO_4$:Ln, $LizCa_{0.99}SiO_4$:Ln, $Sr_{0.9}Ca_{0.1}Al_2O_4$:Ln, $SrSi_2O_2N_2$:Ln, $CaSi_2O_2N_2$:Ln, $Ba_3Si_6O_{12}N_2$:Ln, $Ba_{2.56}Sr_{0.44}Si_6O_{12}N_2$:Ln, $Ba_2SrSi_6O_{12}N_2$:Ln and a combination thereof, with Ln as defined herein.

Preferably, the phosphor material may be selected from $BaMgAl_{10}O_{17}$:Ln, (Sr, Ba)$SiO_4$:Ln, and $Sr_2MgSi_2O_7$:Ln, with Ln as defined herein. In an embodiment, the phosphor material may be selected from the group consisting of $BaMgAl_{10}O_{17}:Eu^{2+}$ (also known as BAM), (Sr, Ba)$SiO_4$: $Eu^{2+}$ (also known as S541), $Sr_2MgSiO_7:Eu^{2+}$, $Dy^{3+}$, and a combination thereof. As a specific embodiment, the phosphor material is $BaMgAl_{10}O_{17}:Eu^{2+}$.

The phosphor material may have a particle size of about 8 μm to about 15 μm, about 7.5 μm to about 15.5 μm, about 8.5 μm to about 14.5 μm, about 9 μm to about 14.5 μm, about 10 μm to about 13 μm, about 11 μm to about 13.5 μm, about 11.5 μm to about 13 μm, about 11.5 μm to about 12.5 μm, or about 11 μm to about 12 μm.

It is believed that with the high quantum yield of the phosphor material as described herein, the coating/coating composition would require less amount of phosphor material to achieve the same effect of heat gain reduction as compared with the case where the phosphor material has a lower quantum yield. In the case where more amount of phosphor material is used, it is believed that the excessive amount of phosphor material would cause more non-radiative decay and energy loss from Stokes shift between the absorbed photons and the emitted photons, and thus hampering the heat gain reduction ability (or cooling effect) of the coating/coating composition.

In an embodiment, the phosphor material of the coating composition of the present invention may have a weight percentage of about 4% wt to about 8% wt, about 4.1% wt to about 8.1% wt, about 3.9% wt to about 8% wt, about 3.9% wt to about 7.9% wt, about 4.5% wt to about 8% wt, about 4.5% wt to about 7.5% wt, about 5% wt to about 7% wt, about 5% wt to about 6% wt, about 5% wt to about 5.9% wt, or about 5.1% wt to about 5.9% wt, with respect to the coating composition. As a specific embodiment, the phosphor material has a weight percentage of about 5% wt with respect to the coating composition.

The $TiO_2$ particles may comprise a rutile crystal structure, an anatase crystal structure, or a mixture thereof. In certain embodiments, the $TiO_2$ particles are amorphous or substantially crystalline. The $TiO_2$ particles may have any shape such as, including, spherical, hollow microspheres, ellipsoidal, polyhedral, rod-shaped, plate-shaped or irregular in shape.

It is believed that when a plurality of $TiO_2$ particles is located at the vicinity of the phosphor material, the $TiO_2$ particles may assemble to form a shell that is analogous to an optical cavity which may change the local dielectric environment of the phosphor material, thereby enhancing the spontaneous radiation thereof. In particular, if the particle size of $TiO_2$ particles is too small or too large, the Mie scattering from $TiO_2$ may derivate from the emission spectra of the phosphor material and it may result in a negligible change of dielectric environment and thus a poor spontaneous radiation enhancement. As a result, it may reduce the cooling ability of the coating/coating composition.

In an embodiment, the $TiO_2$ particles may have a particle size of about 200 nm to about 300 nm, about 205 nm to about 305 nm, about 195 nm to about 300 nm, about 200 nm to about 295 nm, about 210 nm to about 290 nm, about 220 nm to about 285 nm, about 225 nm to about 275 nm, about 230 nm to about 250 nm, about 238 nm to about 248 nm, about 239 nm to about 245 nm, or particularly about 240 nm.

The hollow glass microspheres may be bare (i.e., without coating any other substance thereon) hollow glass microspheres or coated with one or more of a functional material, such as materials that may have photocatalytic properties, antibacterial or antivirus properties, conductivity, reflectance enhancing properties, etc. In an embodiment, the hollow glass microspheres are bare hollow glass microspheres, i.e., with no coating thereon. In another embodiment, the hollow glass microspheres may comprise a coating selected from the group consisting of silver, nickel, zinc(II) oxide, $TiO_2$ with the anatase form, $TiO_2$ with the rutile form, and a combination thereof.

The hollow glass microspheres may have a particle size of about 50 μm to about 60 μm, about 49.5 μm to about 60.5 μm, about 50.5 μm to about 59.5 μm, about 52 μm to about 58 μm, about 52 μm to about 57.5 μm, about 55 μm to about 58 μm, about 56 μm to about 57.5 μm, or particularly about 57 μm.

The polymer matrix may comprise one or more types of polymer. The selection of the polymer may depend on the physical, chemical, optical, and thermal properties required for the specific application. In an embodiment, the polymer matrix may comprise polystyrene, polyacrylate, polyalkylacrylate, polymethacrylate, polyalkylmethacrylate, polycarbonate, polyacryclic acid, polymethacrylic acid, and mixtures thereof, and copolymers thereof. In a particular embodiment, the polymer matrix may comprise a polyacrylate emulsion, a poly-silicone-acrylate emulsion, a polystyrene acrylate emulsion, and mixtures thereof. As a specific embodiment, the polymer matrix is polystyrene acrylic emulsion polymer.

The polymer matrix may have a weight percentage of about 45% wt to about 60% wt, about 44.5% wt to about 60.5% wt, about 45.5% wt to about 59.5% wt, about 48% wt to about 58% wt, about 48% wt to about 57.5% wt, about 49% wt to about 55% wt, about 50.5% wt to about 54.5% wt, or particularly about 51.0%, with respect to the coating composition.

As mentioned above, the Mie scattering of the $TiO_2$ may enhance the spontaneous radiation of the phosphor material. In particular, it is believed that with the enhanced spontaneous radiation, the fluorescence or phosphorescence lifetime of the phosphor material would decrease accordingly, and it may be indicated by an enhancement of Purcell factor. In an embodiment, the fluorescence or phosphorescence lifetime of the phosphor material may be reduced by about 23% to about 61%, with a corresponding Purcell factor of about 1.3 to about 2.6.

As described herein, the coating or coating composition of the present invention is particularly directed to a passive radiative cooling coating or coating composition, which reduces/minimizes heat gain of a medium/article by way of solar reflection and/or thermal emission to the outer space through the atmosphere's longwave infrared (LWIR) transparency window (8-13 μm) during the daytime. In an embodiment, the coating may have an infrared emissivity of at least about 0.9 at about 8 μm to about 13 μm.

The coating composition may further comprise a wetting agent, a dispersant agent, an antifoaming agent, a suspending agent, a levelling agent, a film-forming agent, water, or a mixture thereof, such that a coating formulation may be formed and may be applied to the article by way of, such as spin coating, printing, print screening, spraying, painting, brushing, and dip coating and the like, using appropriate means known in the art, such as brush, blade, roller, sprayer (for example, air-assisted or airless, electrostatic), vacuum coater, curtain coater, flood coater and the like.

The wetting agent may comprise one or more non-ionic surfactants. Examples may include, polyoxyethylene octyl phenol (such as Triton™ X-100), alkylphenoxypolyethoxy (3) ethanol, polyoxyethylene (20) sorbitan monolaurate (Tween® 20), polyoxyethylene (20) sorbitan monopalmitate (Tween® 40), polyoxyethylene (20) sorbitan monostearate (Tween® 60), polyoxyethylene (20) sorbitan tristearate (Tween® 65), polyoxyethylene (20) sorbitan monooleate (Tween® 80), polyoxyethylene (20) sorbitan trioleate (Tween® 85), polyoxyethylene (20) palmitate (G2079), polyoxyethylene (20) lauryl ether, polyoxyethylene (23), polyoxyethylene (25) hydrogenated castor oil (G1292) and polyoxyethylene (25) oxypropylene monostearate (G2162).

The dispersant agent may comprise one or more anionic surfactants. Examples may include, alkyl carboxylates, alkylether carboxylates, polyacrylates, N-acylaminoacids, N-acylglutamates, N-acylpolypeptides, alkylbenzenesulfonates, paraffinic sulfonates, α-olefinsulfonates, lignosulfates, derivatives of sulfosuccinates, polynapthylmethylsulfonates, alkyl sulfates, alkylethersulfates, monoalkylphosphates, polyalkylphosphates, fatty acids, alkali salts of acids, alkali salts of fatty acids, alkaline salts of acids, sodium salts of acids, sodium salts of fatty acid, alkyl ethoxylate, and soaps. In an embodiment, the dispersant agent is a metal polyacrylate, such as sodium polyacrylate.

The antifoaming agent may comprise a $C_{12}$-$C_{30}$ alkyl alcohol, such as iso-octadecanol or dodecanol, a silicone derivative, such as an alkylated silicone, a polydimethylsiloxane, or a polyalkylsiloxane, mineral oil or a mixture thereof. In an embodiment, the antifoaming agent is mineral oil.

The suspending agent may comprise a poly(ethylene glycol ether) copolymer. In an embodiment, the suspending agent is associative polyurethane.

The levelling agent may comprise polydimethylsiloxane with low molecular weight (e.g. <5,000), polyether modified silicone oil, polyester modified silicone oil, phenyl modified silicone oil, and alkyl modified silicone oil, phenyl alkyl co-modified silicone oil, alkyl-polyether co-modified silicone oil, polyurethane and the like. In an embodiment, the levelling agent is polyurethane.

The film-forming agents may include agent that is useful in inducing coating composition to form a condensed membrane/layer at lower temperature. In an embodiment, the coalescent agent is an alcoholic ether compound such as Texanol™.

The article for which the coating composition as described herein may be applied to including, infrastructures, clothing, and automobile. In particular, the infrastructures may be those with components being made of wood, concrete, cement, metal (stainless steel, aluminium alloy, etc.), glass, and the like. Examples as such may include exterior walls, ceilings, roof, etc. The clothing may refer to those worn by workers on external fields, ordinary or sports clothing worn during summertime, and the like. The term "automobile" shall be understood in the art that it refers to motor vehicle, such as private cars, bus, motorcycles, and the like.

Another aspect of the invention relates to a method for reducing heat gain of an article by using the coating composition as described herein. The method comprises the steps of:

a) providing a mixture comprising the coating composition as described herein and one or more of additives, particularly the one or more of additives comprises a wetting agent, a dispersant agent, an antifoaming agent, a suspending agent, a levelling agent, a film-forming agent, water, or a mixture thereof as described herein; and
b) applying the mixture on the surface of article thereby forming a layer of coating thereon.

Step a) particularly comprises the steps of:

i) forming a first mixture comprising the $TiO_2$ particles, the polymer matrix, the phosphor material, the dispersant agent, the suspension agent, the levelling agent, and water under a first stirring speed;
ii) adding to the first mixture, under a second stirring speed, the hollow glass microspheres, the antifoaming agent, and the film-forming agent.

Optionally, the hollow glass microspheres, the antifoaming agent, and the film-forming agent may form a second mixture, prior to adding to the first mixture under the second stirring speed.

It is preferred that the first stirring speed is higher than the second stirring speed, such as by 2 times, 3 times, or 4 times. The first stirring speed should be high enough to disperse all the fillers well. However, such high stirring speed will introduce numerous air bubbles within the mixture. After the antifoaming agent added, a slower stirring speed is required to disperse the agent to eliminate the air bubbles and avoid introducing further bubbles. The first stirring speed may be of about 700 rpm to about 1000 rpm, about 710 rpm to about 1010 rpm, about 690 rpm to about 950 rpm, about 730 rpm to about 930 rpm, about 780 rpm to about 850 rpm, about 790 rpm to about 845 rpm, or particularly about 8900 rpm. The second stirring speed may be of about 300 rpm to about 500 rpm, about 295 rpm to about 495 rpm, about 305 rpm to about 505 rpm, about 320 rpm to about 480 rpm, about 320 rpm to about 450 rpm, about 360 rpm to about 455 rpm, about 380 rpm to about 440 rpm, about 400 rpm to about 440 rpm, or particularly about 400 rpm.

In an embodiment where the mixture comprises polystyrene acrylic emulsion polymer (30-60 wt. %), phosphor material, such as BAM, S541 (about 2-10 wt. %), $TiO_2$ particles (about 10-30 wt. %), hollow glass microspheres (about 2-15 wt. %), water (about 20-50 wt. %), dispersant agent, such as polycarboxylate sodium salt (about 0.5-1.5 wt. %), antifoaming agent, such as mineral oil (about 0.5-1.5 wt. %), suspending agent, such as associative polyurethane (0.2-0.8 wt. %), levelling agent, polyurethane (about 0.3-1 wt. %), and film-forming agent, such as Texanol™ (about 1-3.5 wt. %), the mixture may be prepared by:

i) forming the first mixture by mixing the polystyrene acrylic emulsion polymer, the $TiO_2$ particles, the phosphor material, and water, for example, in a beaker, followed by adding to the beaker with the dispersant agent, the suspension agent, and the levelling agent, under a first stirring speed of about 800 rpm for about 1 hour; and ii) adding the hollow glass microspheres, the antifoaming agent, the film-forming agent to the first mixture under a second stirring speed of about 400 rpm, and stirring for about 30 min.

Step b) particular comprises the step of spraying the mixture on the surface of article at a predefined pressure. The mixture may be loaded into a tool which may output the mixture at a particular pressure. Examples may include a hand sprayer, a pump sprayer, manual pressure sprayer, spray gun and the like. As a specific embodiment, the tool may be a spray gun. The mixture may be applied onto the surface of the article at a pressure from about 4 MPa to about 10 MPa, about 3.9 MPa to about 10 MPa, about 4 MPa to about 10.1 MPa, about 4.1 MPa to about 9.9 MPa, about 4.3 MPa to about 9.7 MPa, about 4.3 MPa to about 9.5 MPa, about 4.4 MPa to about 9.5 MPa, about 4.6 MPa to about 9 MPa, about 4.7 MPa to about 8.5 MPa, about 4.7 MPa to about 8 MPa, about 4.8 MPa to about 7.5 MPa, about 4.8 MPa to about 6.5 MPa, about 4.8 MPa to about 5.8 MPa, about 4.8 MPa to about 5.6 MPa, about 4.9 MPa to about 5.5 MPa, or particularly about 5 MPa.

The coating composition may be applied to the article as described herein. In an embodiment, the surface of such article may be the one that is previously painted, primed, undercoated, worn, or weathered. In another embodiment, the surface of such article may not be previously painted, primed, undercoated, worn, or weathered.

EXAMPLES

Instrumentation and Characterization

The dark-field scattering spectra of $TiO_2$ nanoparticles were measured on a customized upright microscope system (Olympus, BX51). The sample was illuminated with a white light source after being focused with a 100× dark-field objective (NA=0.8). The cross-section of the coating and single $TiO_2$ nanoparticles was characterized by using an FEI Quanta™ 450 field-emission scanning electron microscope at a voltage of 15 kV.

Reflectance spectra of white coating and reference samples were measured on a PerkinElmer Lambda® 1050+ UV/vis/NIR wide band spectrometer equipped with an integrating sphere. Excitation spectra, emission spectra, PL lifetime and quantum yield of pure phosphor (i.e., phosphor alone)/FERC coatings were collected on an Edinburgh Instruments FLS900 fluorescence spectrometer. The size distributions of $TiO_2$ powders and phosphors were characterized by using a Malvern Mastersizer® 3000 particle size analyser.

Example 1

Preparation of Fluorescence-Enhanced Radiative Cooling (FERC) Coating

The fluorescence-enhanced radiative cooling coating (i.e., the coating composition of the present invention) was prepared as follows: 20 g poly-styrene-acrylic emulsion (EC-702, BASF (China) Co. Ltd.), 12 g $TiO_2$ nanoparticles (Ti-Pure® R902, DuPont™), phosphor material (Shenzhen Looking Long Technology Co. Ltd.) and an appropriate amount of water were first mixed in a 50 mL beaker under continuous stirring, followed by the addition of 0.4 g dispersant agent (polycarboxylate sodium salt), 0.2 g suspension agent (associative polyurethane) and 0.24 g leveling agent (polyurethane). The mixture was stirred at 800 rpm $min^{-1}$ for one hour. Then the stirring speed was reduced to 400 rpm $min^{-1}$ and 3 g hollow glass microspheres (Glass Bubble K25, 3M™), 0.4 g anti foaming agent (mineral oil) and 1 g film-forming agent (Texanol™) were added. All the agents were purchased from Guangzhou Run Hong Chemical Co. Ltd. After 30 min of stirring, the mixture was sprayed evenly on the cement board using a spray gun under a pressure of 5 MPa.

It is believed that the polymer matrix would provide primary infrared emission whereas the hollow glass microspheres would improve the infrared emissivity of the coating by way of the surface phonon-polarition resonance at about 9 μm.

Example 2

Structural Characterization of FERC Coating

Figure 2A:
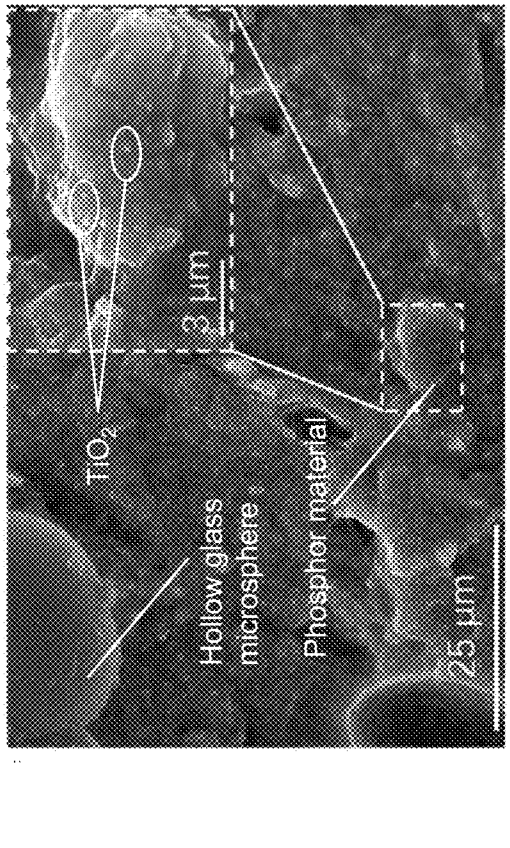
FIG. 2A shows a scanning electron microscope (SEM) image of the FERC coating prepared in accordance with an embodiment of the present invention. The insert shows the enlarged view of the phosphor microparticle.
Figure 2B:
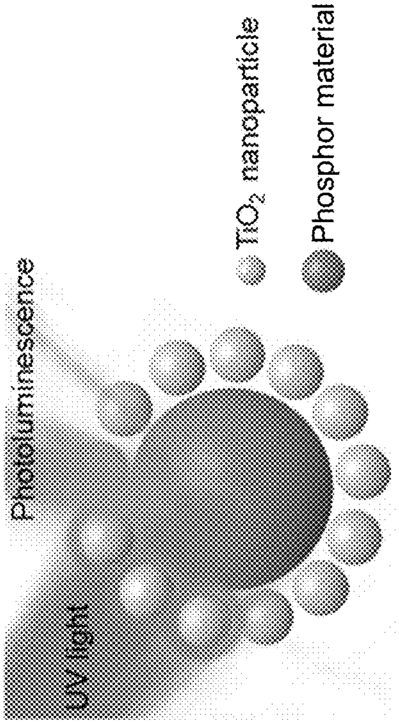
FIG. 2B shows a schematic diagram illustrating the Purcell enhancement of a phosphor particle attached with $TiO_2$ nanoparticles (NPs).

The microstructure of the FERC coating was studied by scanning electron microscope (SEM). As shown in FIG. 2A, the large green-yellowish region indicates the hollow glass microspheres. The phosphor material (as indicated by the red regions) were dispersed randomly in the polymer matrix. Noteworthy, the $TiO_2$ nanoparticles (as indicated by the tiny white spots) were densely located on the surface of the phosphor material. It is believed that when large amounts of $TiO_2$ nanoparticles locate at the vicinity of phosphor material, the shell assembled by $TiO_2$ nanoparticles would act as if an analog to an optical cavity which can effectively modulate the dielectric environment around the exterior surface of the phosphor material mimicking the Purcell effect as shown in FIG. 2B. It is also believed that the multiple Mie scattering among the $TiO_2$ nanoparticles would lengthen the retention time of solar light within the coating, and therefore the solar light can be confined spatially and temporally by $TiO_2$ nanoparticles, which enables the Purcell enhancement.

Example 3

Optical Properties of FERC Coating and Size Distribution Characterization

Figure 3A:
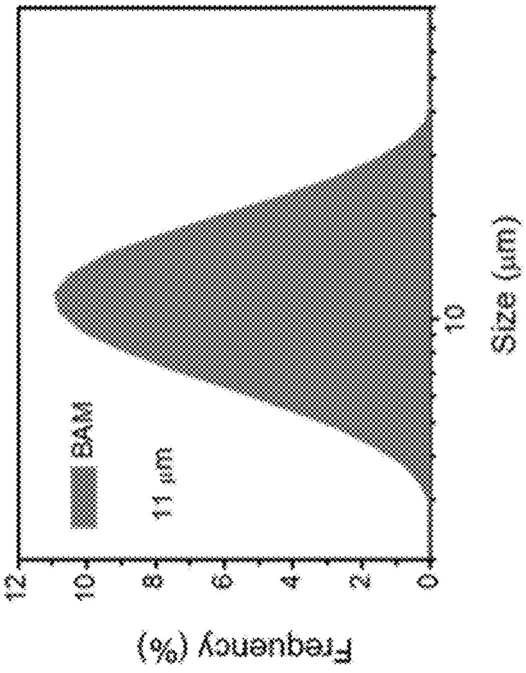
FIG. 3A shows the size distribution of BAM phosphor.
Figure 3B:
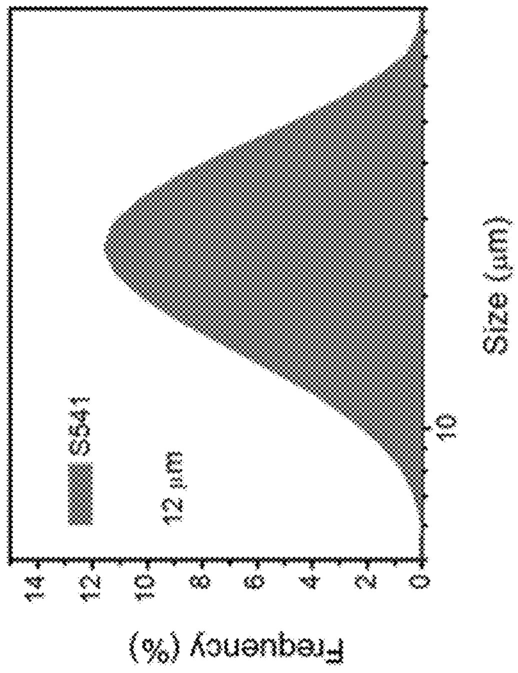
FIG. 3B shows the size distribution of S541 phosphor.

Two phosphors, $BaMgAl_{10}O_{17}:Eu^{2+}$ (BAM) and $(Sr, Ba)SiO_4:Eu^{2+}$ (S541) with different PL spectra were used to study the effect of their optical properties on the cooling effect. Before discussing their optical properties, their size distributions have been determined. As shown in FIGS. 3A and 3B, the average sizes of BAM and S541 were determined to be about 11 μm and about 12 μm, respectively.

Due to the energy loss during photon conversion of down-conversion materials, it is believed that high quantum efficiency would be favourable for phosphors to diminish solar absorption of the FERC coating. The inventors thus have determined the quantum yields (QY) of BAM and S541, respectively, on an Edinburgh FLS980 spectrometer equipped with an integrating sphere. Specifically, the phosphors were put into the integrating sphere to collect its excitation and emission spectra, followed by collecting the same range of excitation and emission spectra of a blank integrating sphere. The QY is determined by dividing the emitted photon number by the absorbed photon number, where the photon number emitted by the phosphor is the difference between the integrated emission spectrum with and without the phosphor; and the photon number absorbed by the phosphor is the difference between the integrated excitation spectrum with and without the phosphor. As illustrated in FIG. 4, the quantum yields of BAM and S541 are both about 90%, which are considerably higher than that of the counterpart $SrAl_2O_4:Eu^{2+}$, $Dy^{3+}$, $Yb^{3+}$.

Figure 5B:
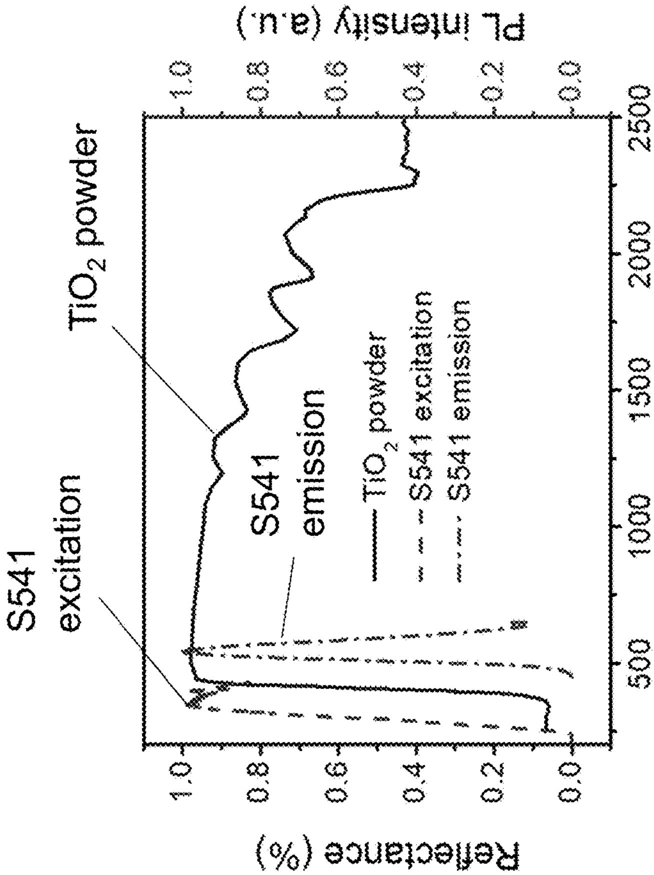
FIG. 5B a plot showing the solar reflectance of a $TiO_2$ NP-based white coating and the excitation and emission spectra of S541.
Figure 5A:
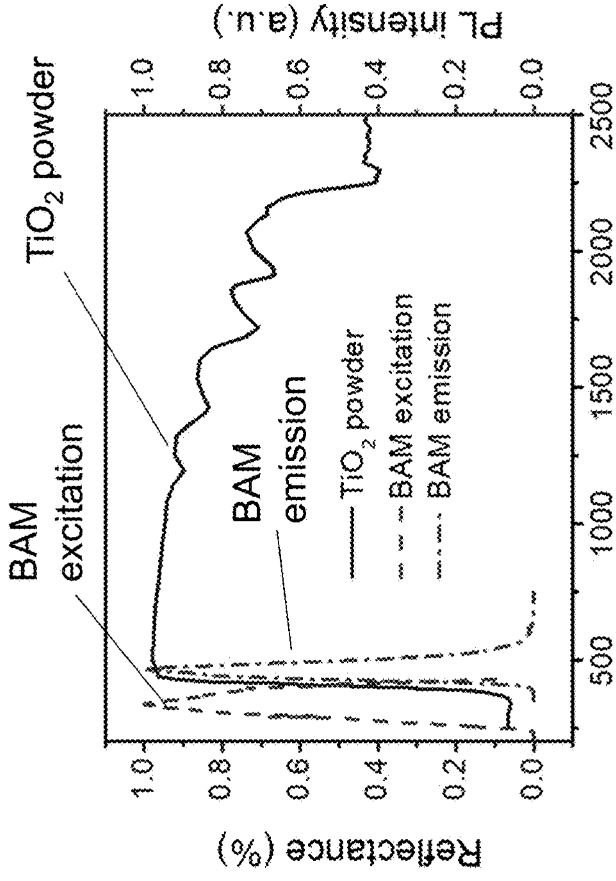
FIG. 5A is a plot showing the solar reflectance of a $TiO_2$ NP-based white coating and the excitation and emission spectra of BAM.

The excitation, emission spectra of BAM and S541, in comparison with the reflectance spectra of $TiO_2$-based white coating without phosphors are illustrated in FIGS. 5A and 5B. As shown, the excitation peaks of BAM (about 333 nm) and S541 (about 341 nm) are located within the UV absorption region of $TiO_2$, suggesting that the phosphors could compete with $TiO_2$ for UV light absorption. The emission peak of BAM (about 463 nm) has a shorter wavelength than that of S541 (about 539 nm). The spectral profiles of the emission peaks of the two phosphors are very similar, while S541 has a larger Stokes shift than BAM.

Figure 6A:
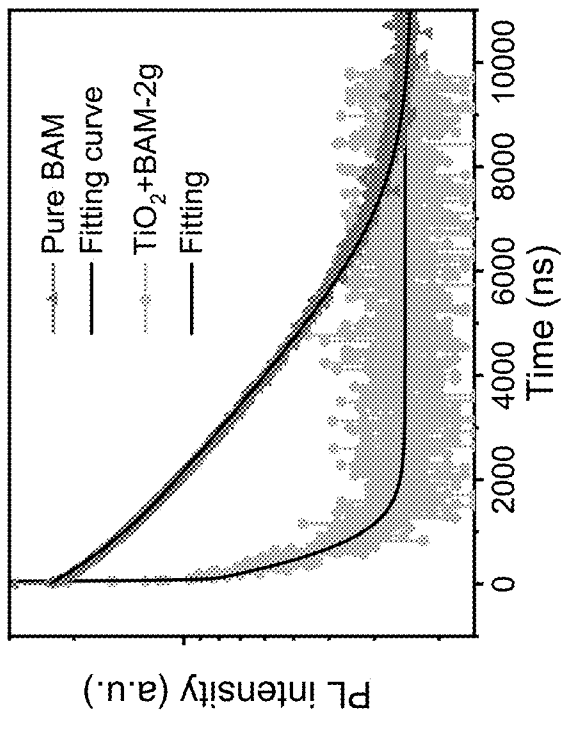
FIG. 6A is a plot showing the measured photoluminescence (PL) decay curves of pure BAM and BAM in the white coating, and the corresponding fitting results.
Figure 6B:
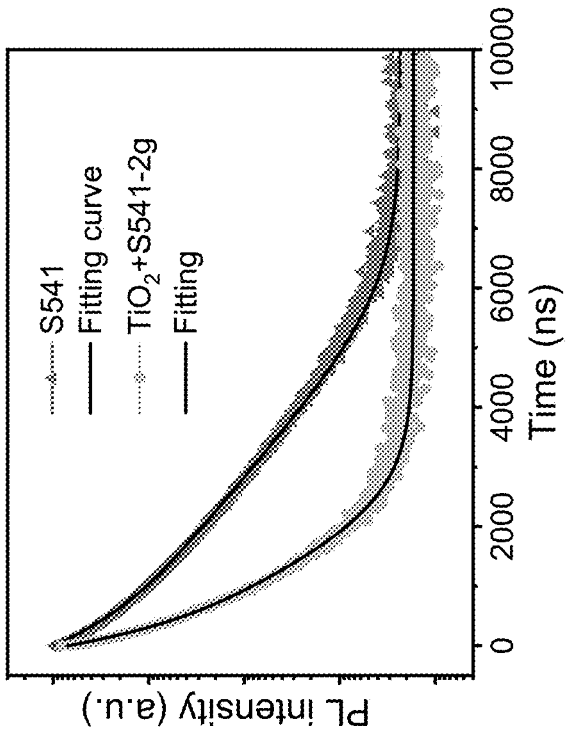
FIG. 6B is a plot showing the measured PL decay curves of pure S541 and S541 in the white coating, and the corresponding fitting results.

It is believed that one of the indicators of the Purcell effect is the reduced photoluminescence (PL) lifetime of the phosphor material after which has been added to into the $TiO_2$-based coating. The PL lifetime of both phosphors were thus characterized. As shown in FIGS. 6A and 6B, both phosphors show an obvious decrease in the PL lifetime after being added to the coating. The biexponential fitting of lifetime decay curves was performed by using the following equation:

$$I(t) = I_0 + A_1 \exp\left(-\frac{t}{\tau_1}\right) + A_2 \exp\left(-\frac{t}{\tau_2}\right) \quad (1)$$

where $\tau_1$ and $\tau_2$ are non-radiative and radiative lifetime, respectively. $I_0$, $A_1$ and $A_2$ denote amplitudes for PL intensities.

The fitting data are shown in FIG. 6C. The radiative lifetime $\tau_2$ shows a decrease by about 61% for BAM and by about 23% for S541 in the coating as compared with the phosphor alone. Therefore, the spontaneous emission rates are significantly enhanced by their environment, mimicking the Purcell effect in optical cavities.

The Purcell effect may be quantified by the Purcell factor, which can be calculated through the fitted radiative lifetime as:

$$F_P = \frac{1/\tau_{2,coat}}{1/\tau_{2,pure}} \quad (2)$$

where $\tau_{2,pure}$ and $\tau_{2,coat}$ represent the radiative lifetimes of the phosphor alone and phosphor in the coatings, respectively. The Purcell factors of BAM and S541 were determined to be about 2.6 and 1.3, respectively. Based on the above, it is believed that as the lifetimes were shortened, more photons will be emitted in unit time, which increases the PL power intensity and boosts solar reflectance of the FERC coating.

Figure 7:
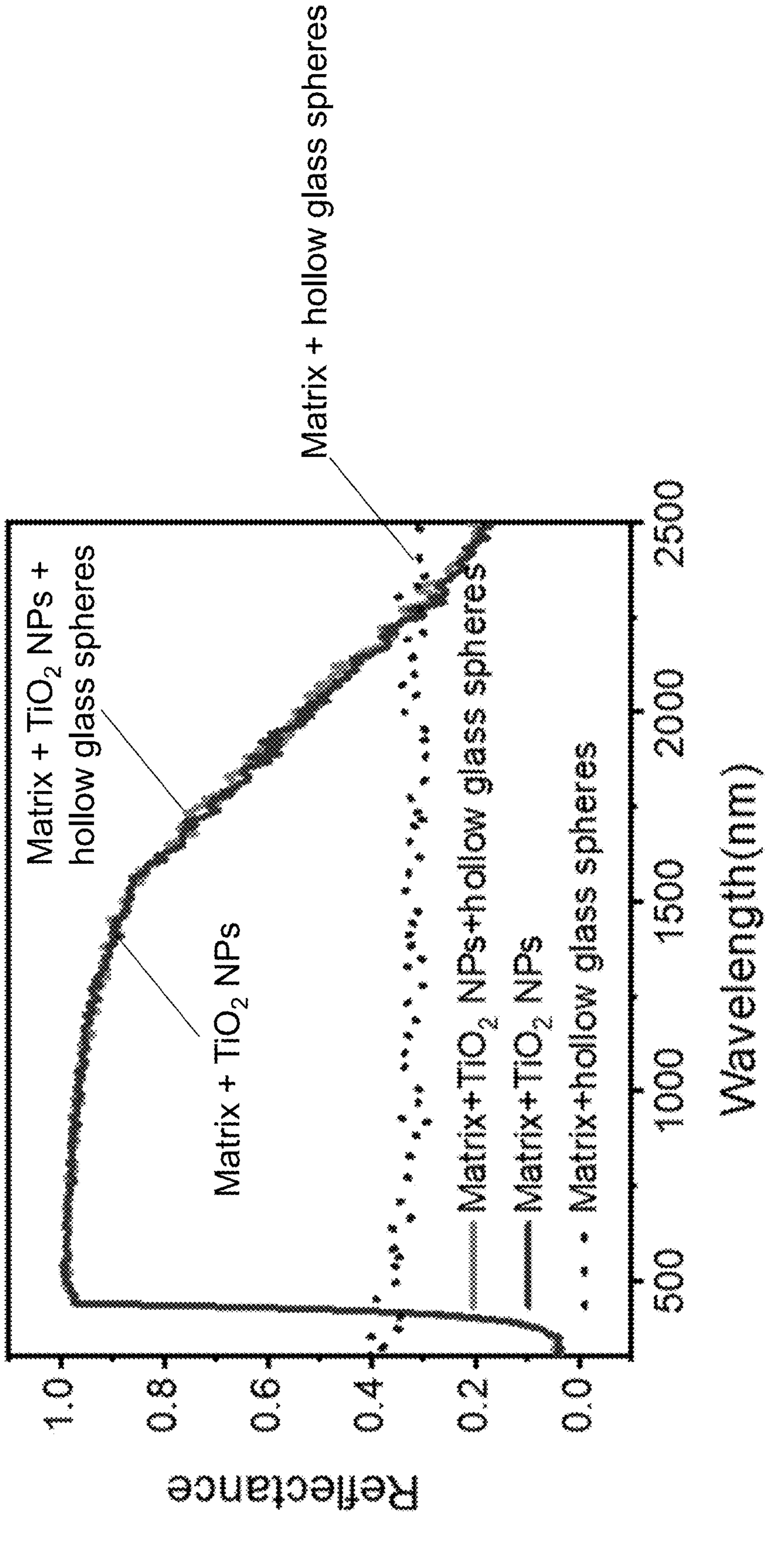
FIG. 7 is a plot showing the theoretical solar reflectance of three different coatings based on the Monte Carlo calculations.
Figure 8A:
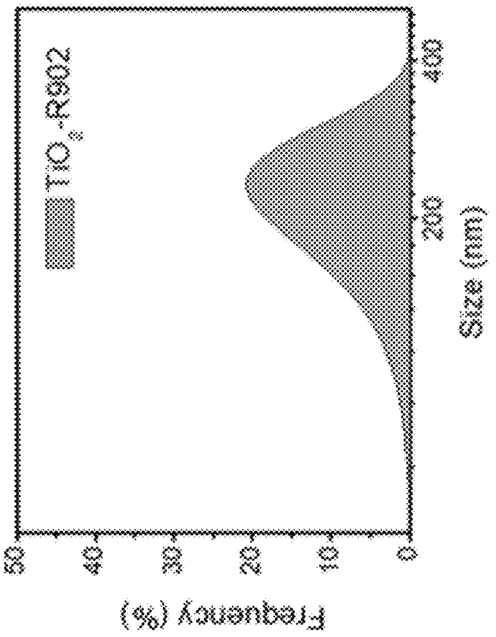
FIG. 8A shows the size distribution of $TiO_2$ (R902).
Figure 8B:
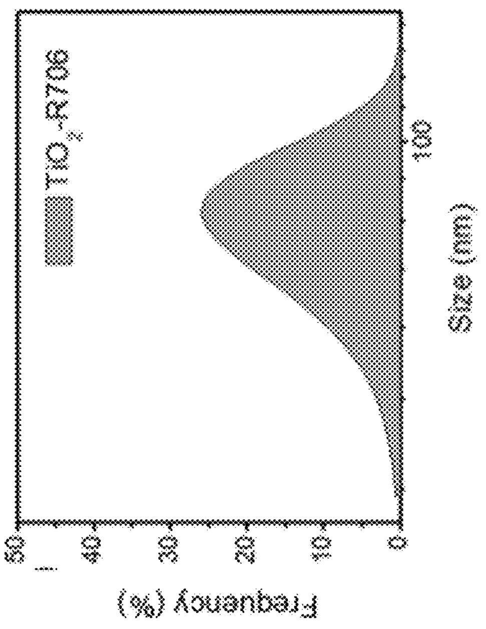
FIG. 8B shows the size distribution of $TiO_2$ (R706).
Figure 8C:
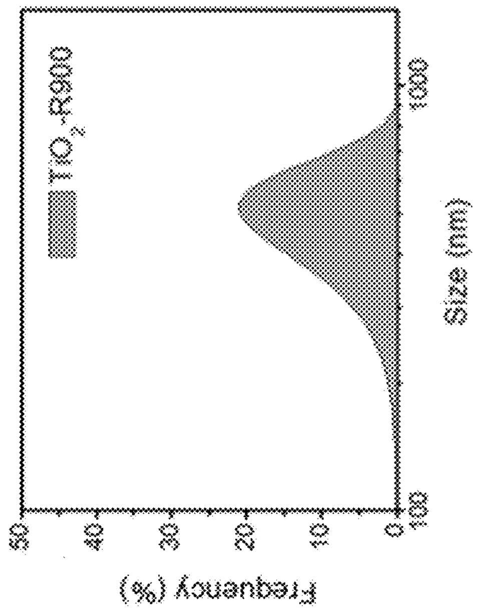
FIG. 8C shows the size distribution of $TiO_2$ (R900).
Figure 9B:
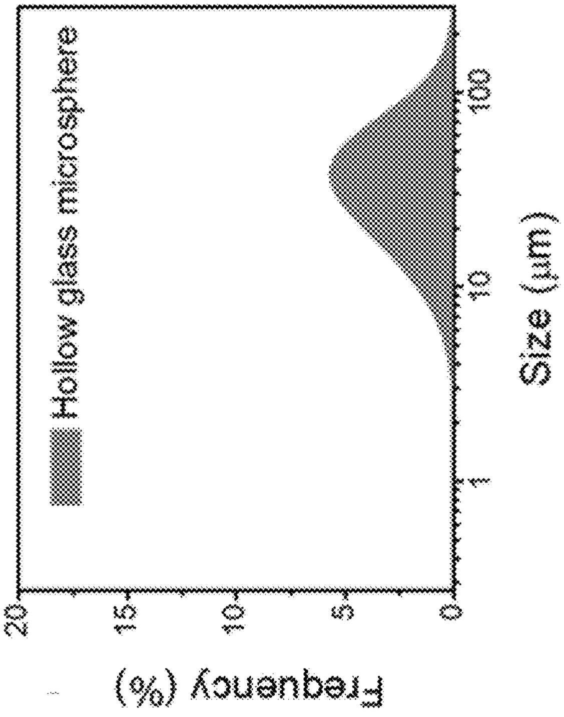
FIG. 9B shows the size (outer diameter) distribution of the hollow glass microspheres.
Figure 9A:
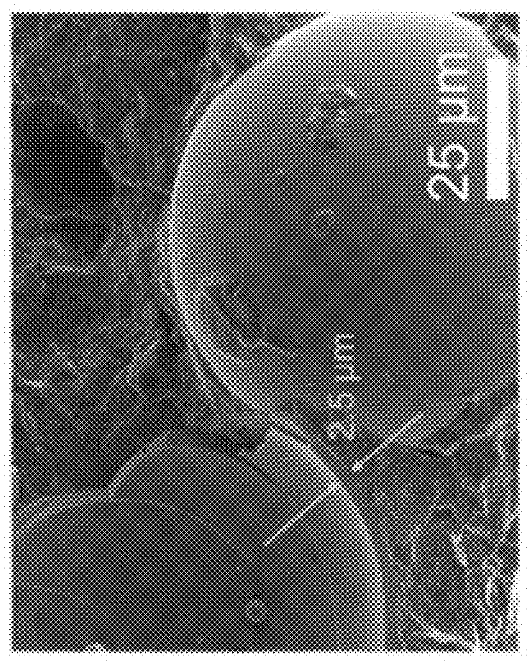
FIG. 9A is a SEM image showing the cross-section of a hollow glass microsphere. The shell thickness is fixed at about 2.5 μm.

To understand the influence of different components on solar reflectance the coatings, Monte Carlo calculations based on random particles distribution were performed. $TiO_2$ NPs were assumed to be spherical to obtain analytical solutions for their scattering parameters. Three coatings (matrix+$TiO_2$ NPs; matrix+hollow glass spheres; and matrix+$TiO_2$ NPs+hollow glass spheres) were calculated and analyzed as shown in FIG. 7. The overall solar reflectance was determined to be about 0.88. It can be observed that the solar reflectance of the coatings is mainly contributed from $TiO_2$ NPs rather than from hollow glass spheres. Hollow glass spheres will not influence the overall solar reflectance since their sizes are too large to produce Mie resonances and thereby manifest low scattering efficiency. The size distributions and volume fractions of the $TiO_2$ NPs, polymer matrix, hollow glass microspheres, and phosphor, are shown in FIGS. 8A to 8C, 9A and 9B, and 10.

Figure 11:
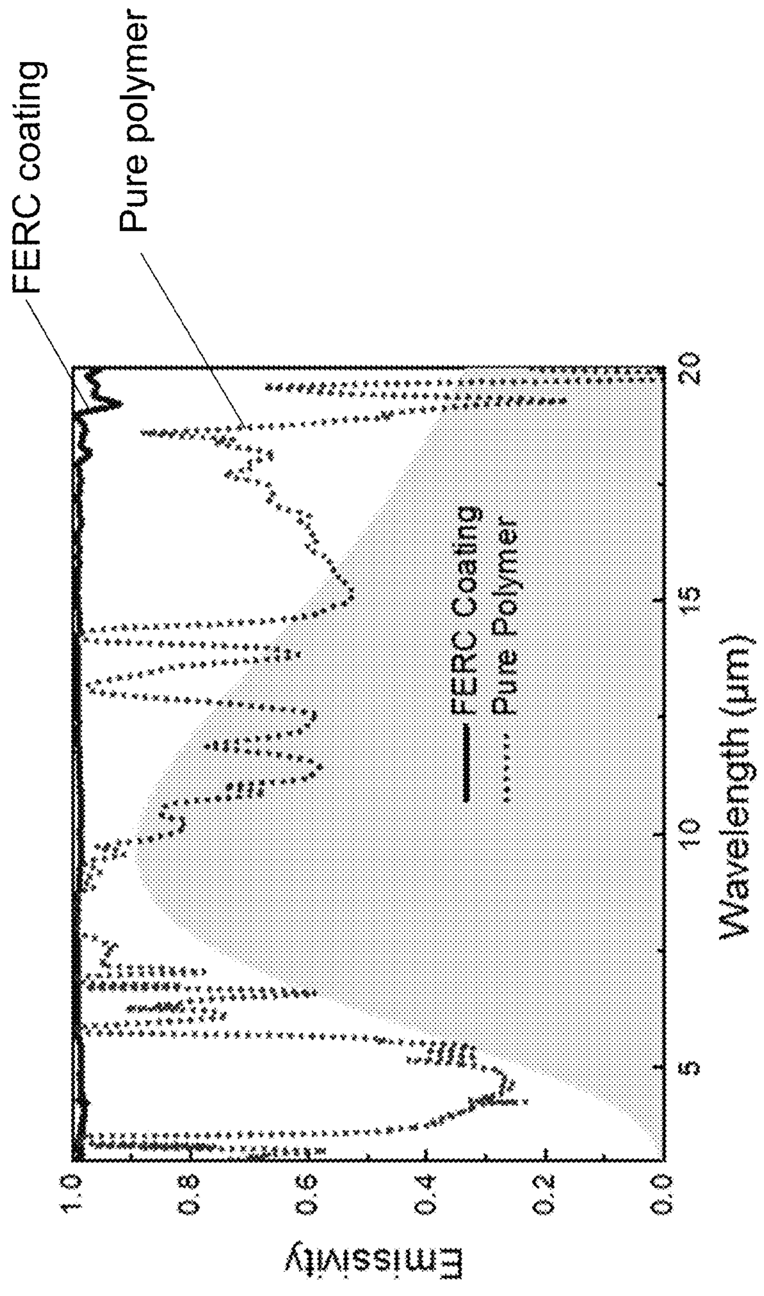
FIG. 11 is a plot showing the emissivity of FERC coating and pure polymer matrix.

Here, it is noted and believed that fluorescent light from the phosphor is unlikely to be distinguished from the reflected light for commercial UV/VIS/NIR spectrometers, and thus, only the solar reflectance of the $TiO_2$-based white coating without phosphor was determined. Nonetheless, it is believed that the FERC coating would have substantially similar solar reflectance as the white coating. FIG. 11 illustrates the infrared emissivity of the FERC coating. As shown, an overall infrared emissivity over 0.95 was determined for the FERC coating.

Example 4

In Situ Dark-Field Scattering Measurements

To this end, it is believed that the two requirements for enabling Purcell enhancement, increasing (spontaneous) emission rate and confining light spatially and temporally, have been met. To obtain higher Purcell enhancement, scattering features of $TiO_2$ nanoparticles (NPs) should be matched with the emission spectra of phosphors. To investigate the scattering features of commercial $TiO_2$ powder, which consists of non-uniform sizes and irregular morphology (i.e., non-analytical scattering), in situ dark-field scattering (DFS) measurement was conducted. For single particle characterization, the $TiO_2$-water suspension was sprayed onto a glass substrate to sparsely disperse $TiO_2$ NPs. The optical image under a dark-field microscope and the corresponding scanning electron microscopy (SEM) image are shown in FIG. 12A.

Figure 12A:
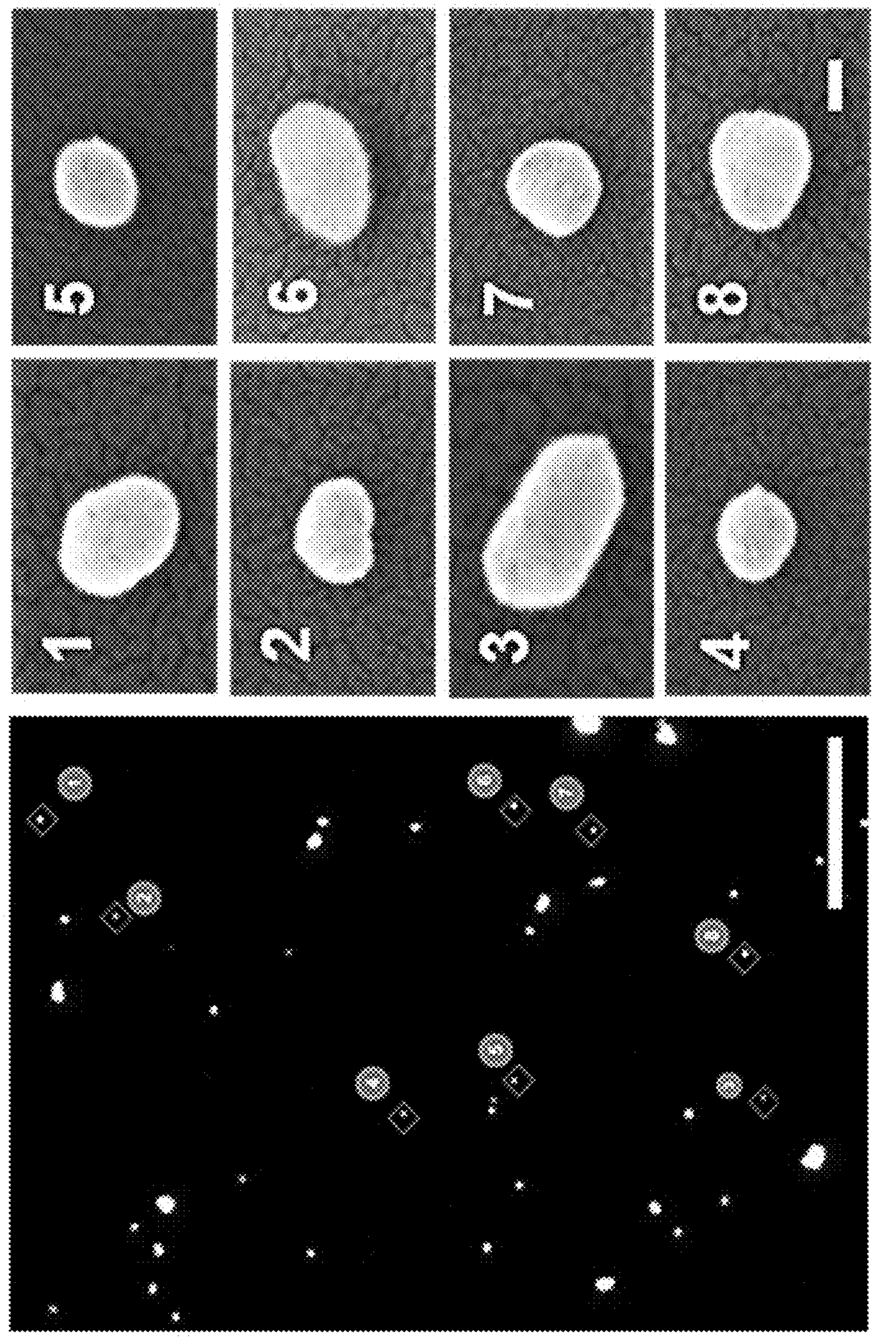
FIG. 12A shows dark field image (left panel, scale bar=20 μm) and in situ SEM image (right panel, scale bar=100 nm) of eight single $TiO_2$ NPs.
Figure 12B:
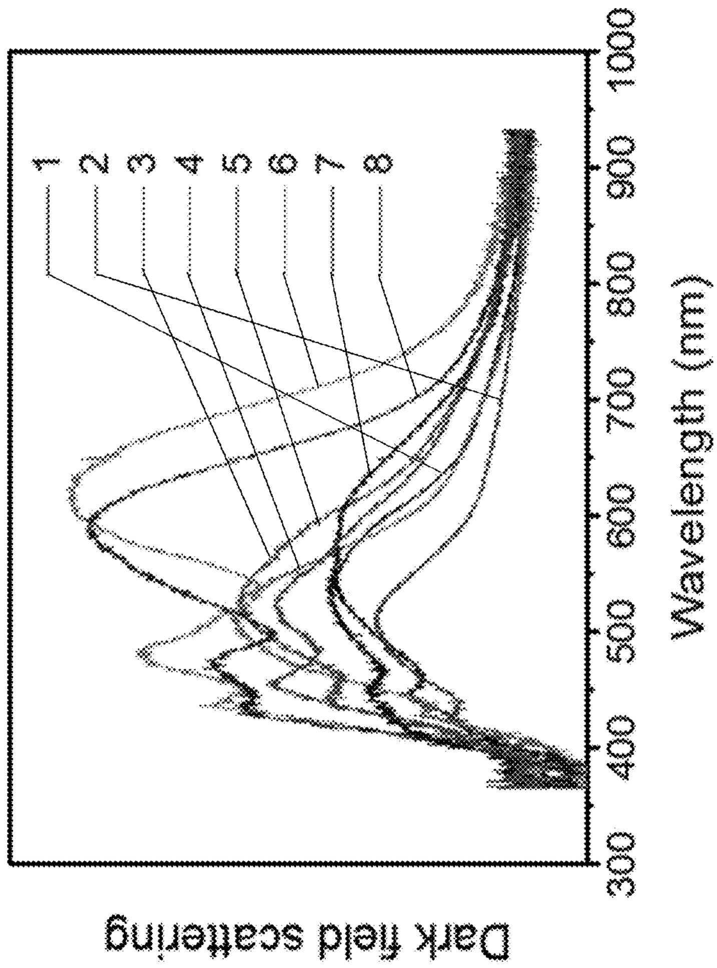
FIG. 12B is a plot showing the dark-field scattering (DFS) spectra of $TiO_2$ NPs shown in FIG. 12A.

The tiny yellow-green spots represent the single $TiO_2$ NPs whereas the larger white spots represent the $TiO_2$ clusters (FIG. 12A, left panel). Eight single $TiO_2$ nanoparticles were selected for DFS measurement as well as in situ SEM imaging. As shown in FIG. 12B, all the $TiO_2$ NPs have a non-ideal geometry, which can be regarded as quasi-sphere, rod, triangular, etc. The scattering peaks of $TiO_2$ NPs mainly distribute within about 450 nm to about 600 nm, corresponding to the wavelength range of yellow-green light. More peaks emerge for $TiO_2$ NPs with higher irregularity.

Figure 13B:
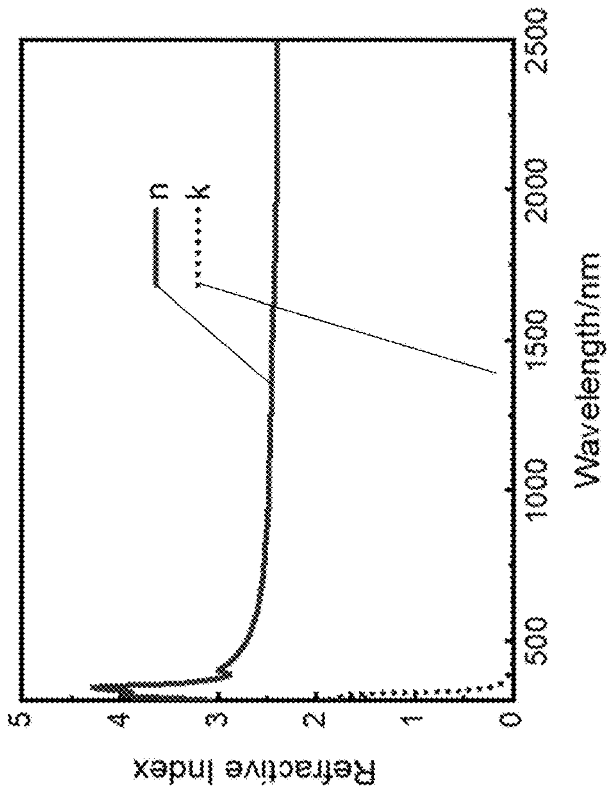
FIG. 13B is a plot showing the refractive index (n) and the extinction coefficient (k) of $TiO_2$ NPs in simulation.
Figure 13A:
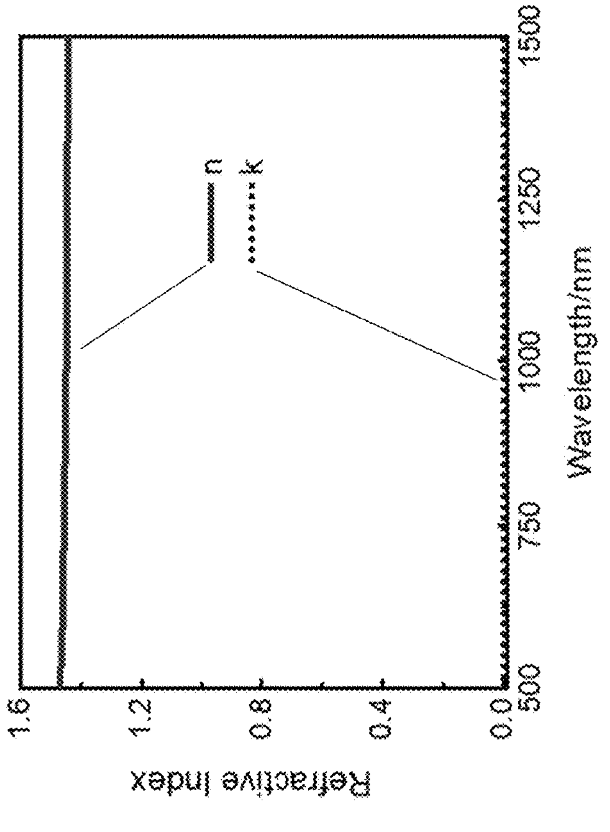
FIG. 13A is a plot showing the refractive index (n) and the extinction coefficient (k) of glass substrate in simulation.
Figure 13C:
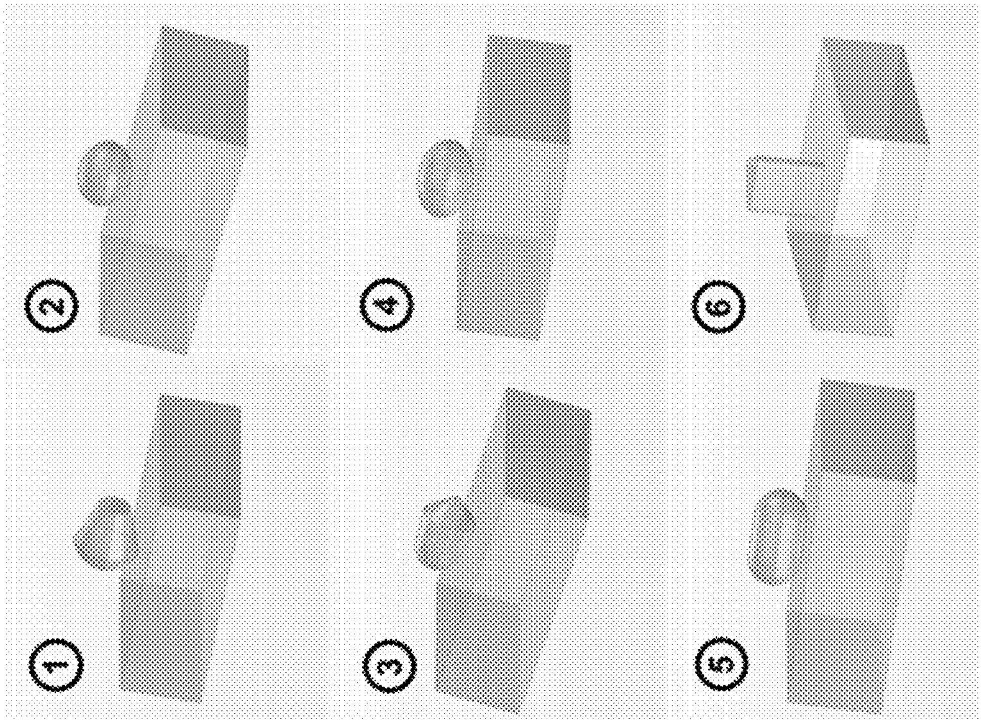
FIG. 13C is a schematic diagram illustrating the structures of six single $TiO_2$ NPs on glass substrate built in COMSOL.

Further numerical simulations for DFS spectra of $TiO_2$ NPs were carried out with extracted geometry from the SEM images. Specifically, the simulations were conducted using finite-element-method based software COMSOL. Six out of the eight TiO2 NPs in FIG. 12A were reproduced in COMSOL with extracted shapes and sizes from zoom-in SEM image. A glass substrate under the NPs and air above the NPs were added in the simulation structures. Periodic boundary conditions and two ports were applied. Periodic boundary conditions and two ports were applied. The refractive index (n) of TiO2 and glass used in simulation are given in FIGS. 13A and 13B. The reproduced structures for TiO2 NPs in COMSOL were demonstrated in FIG. 13C. Good agreements in scattering peaks in which the morphologies were well reconfigured while only the spectral envelop was observed when the morphologies were hard to reconfigured (data not shown).

The high scattering efficiency after 450 nm indicates a moderate dielectric regulation, leading to modulation of spontaneous emission of both BAM and S541. It should be noted that only $TiO_2$ NPs with suitable sizes can be recognized in the DFS measurement due to low accuracy for small particles (<50 nm) and difficulties in distinguishing large particles (>400 nm) from clusters. Thus, in this work, $TiO_2$ powder with particle sizes centred at about 200 nm was chosen.

Figure 14:
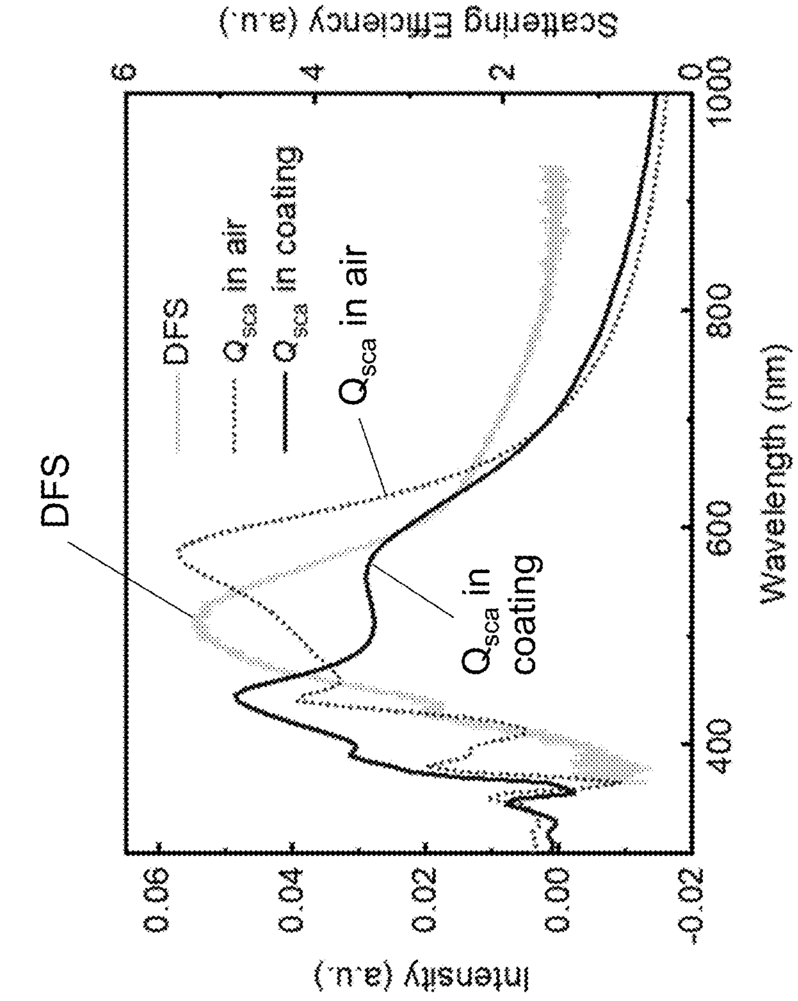
FIG. 14 is a plot showing the DFS spectra of $TiO_2$ NP in FIG. 12A, the calculated scattering efficiency of spherical $TiO_2$ NP at diameter of about 212 nm in air and in coating.

Meanwhile, after added into the coating, dielectric environment will change and influence the scattering spectra. To evaluate the impact of coating, the scattering efficiency of a spherical $TiO_2$ NP at diameter of about 212 nm (i.e., approximately the geometry of the $TiO_2$ NP no. 4 in FIG. 12A) was calculated. As shown in FIG. 14, with the surrounding medium being air, the peak scattering exhibits red shift as compared with the DFS result, which is attributed to the low refractive index of air. When the surrounding medium is the coating, blue shift emerges for peak scattering. Therefore, BAM with emission peak at shorter wavelength will match the scattering peak of $TiO_2$ NPs in the coating better than S541, contributing to the higher Purcell factor of BAM.

Figure 15A:
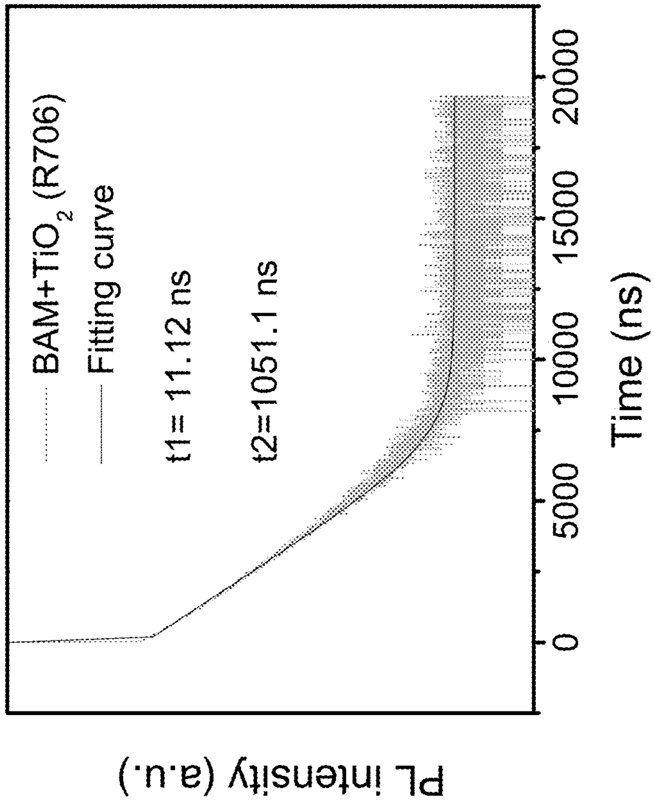
FIG. 15A is a plot showing the PL lifetime of BAM phosphor after added into the FERC coating with R706 $TiO_2$.
Figure 15B:
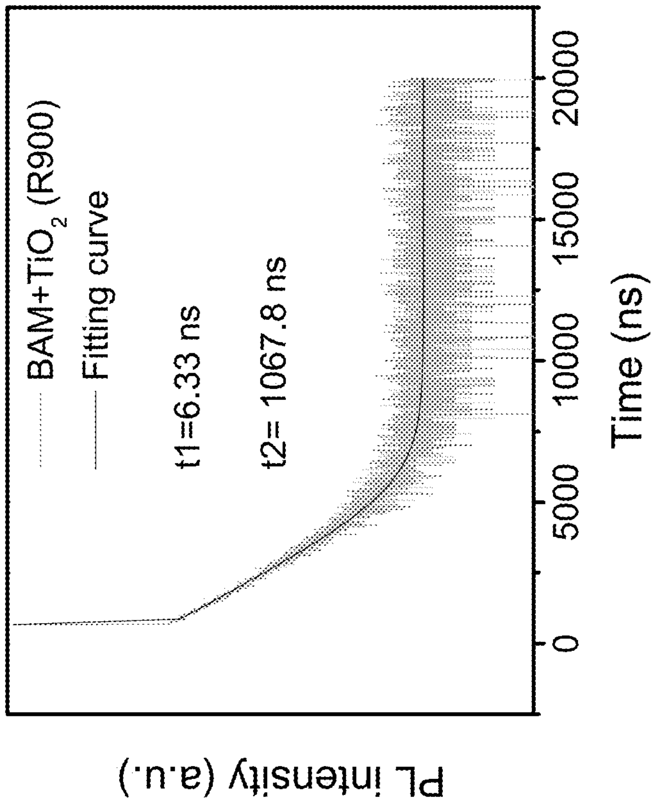
FIG. 15B is a plot showing the PL lifetime of BAM phosphor after added into the FERC coating with R900 $TiO_2$.

For $TiO_2$ powders with smaller or larger size distributions (FIGS. 8B and 8C), peak scattering deviates from the emission spectra of the phosphors, resulting in ignorable dielectric modulation and thus the Purcell enhancement. As shown in FIGS. 15A and 15B, nearly no lifetime reduction was observed for $TiO_2$ (R706) and $TiO_2$ (R900).

Example 5

Field Test

Figure 16A:
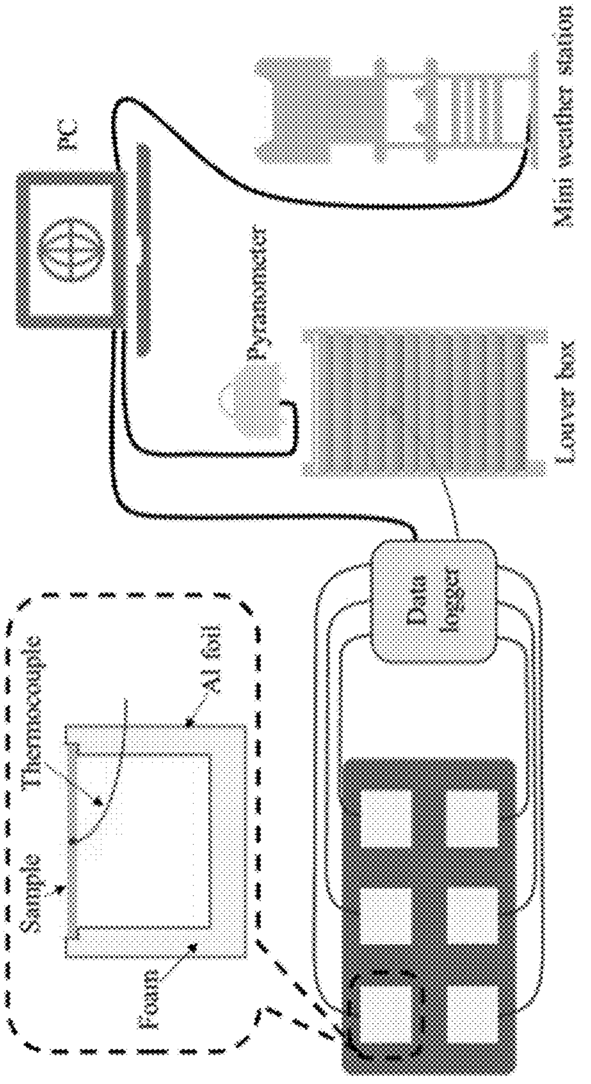
FIG. 16A is a schematic diagram illustrating the apparatus used in field test.
Figure 16B:
FIG. 16B is a photo showing the apparatus practiced in field test.

Field test has been performed to evaluate the cooling performance of the coating. The apparatus for the field test is shown in FIGS. 16A and 16B. The samples consisting of coatings sprayed on commercially available cement boards were placed on an Al-foil covered, thermally insulated foam box without the polyethylene cover. κ-Type thermocouples were embedded into the cement boards near the coated surfaces for measuring the sample temperature. One thermocouple was placed in a louver box to measure the ambient temperature. The real-time temperatures of coatings and ambient air were recorded on a multichannel data logger (MEMORY HiLOGGER LR8431-30, Hioki E.E. Co.). Solar intensity and relative humidity were recorded by using a pyranometer (MS-802, EKO Instruments) and a mini weather station (WS601-UMB, Lufft).

Figure 17A:
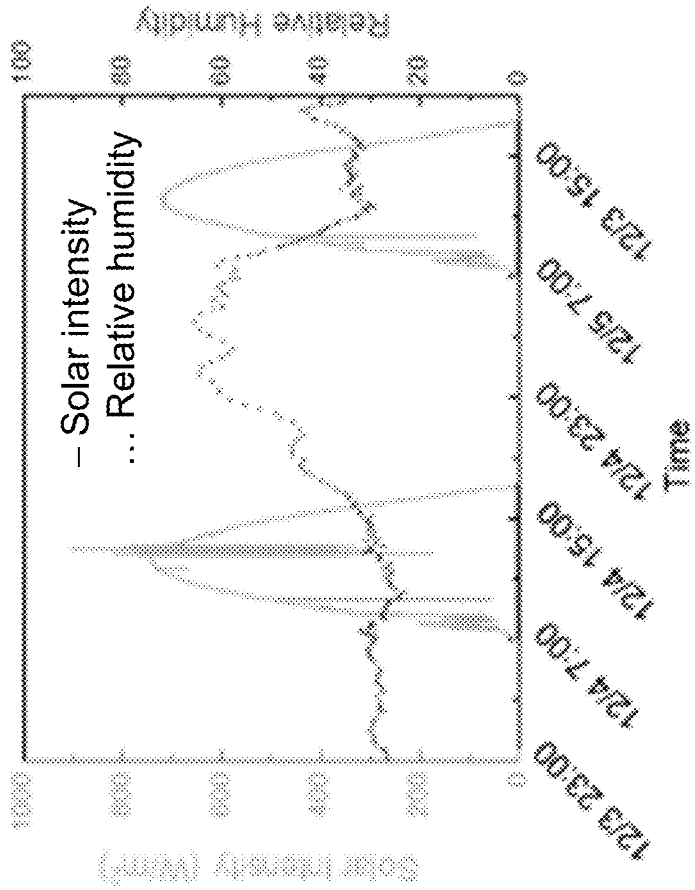
FIG. 17A is a plot showing the solar intensity and relative humidity during the field test from 3 December to 5 December.
Figure 17B:
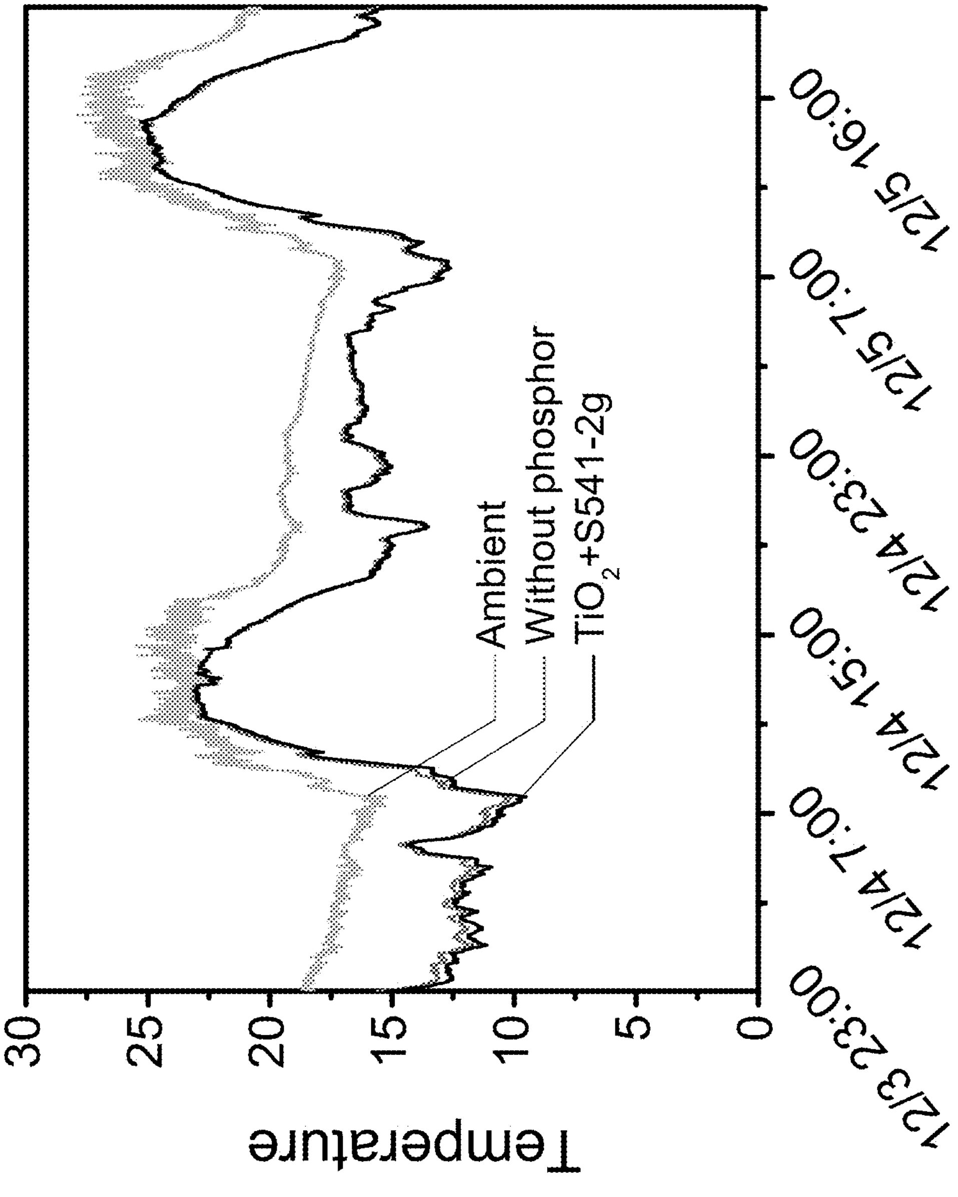
FIG. 17B is a plot showing the recorded temperature curves of ambient, white coating without phosphors, and the FERC coatings with S541 in sunny winter days in Hong Kong.
Figure 17C:
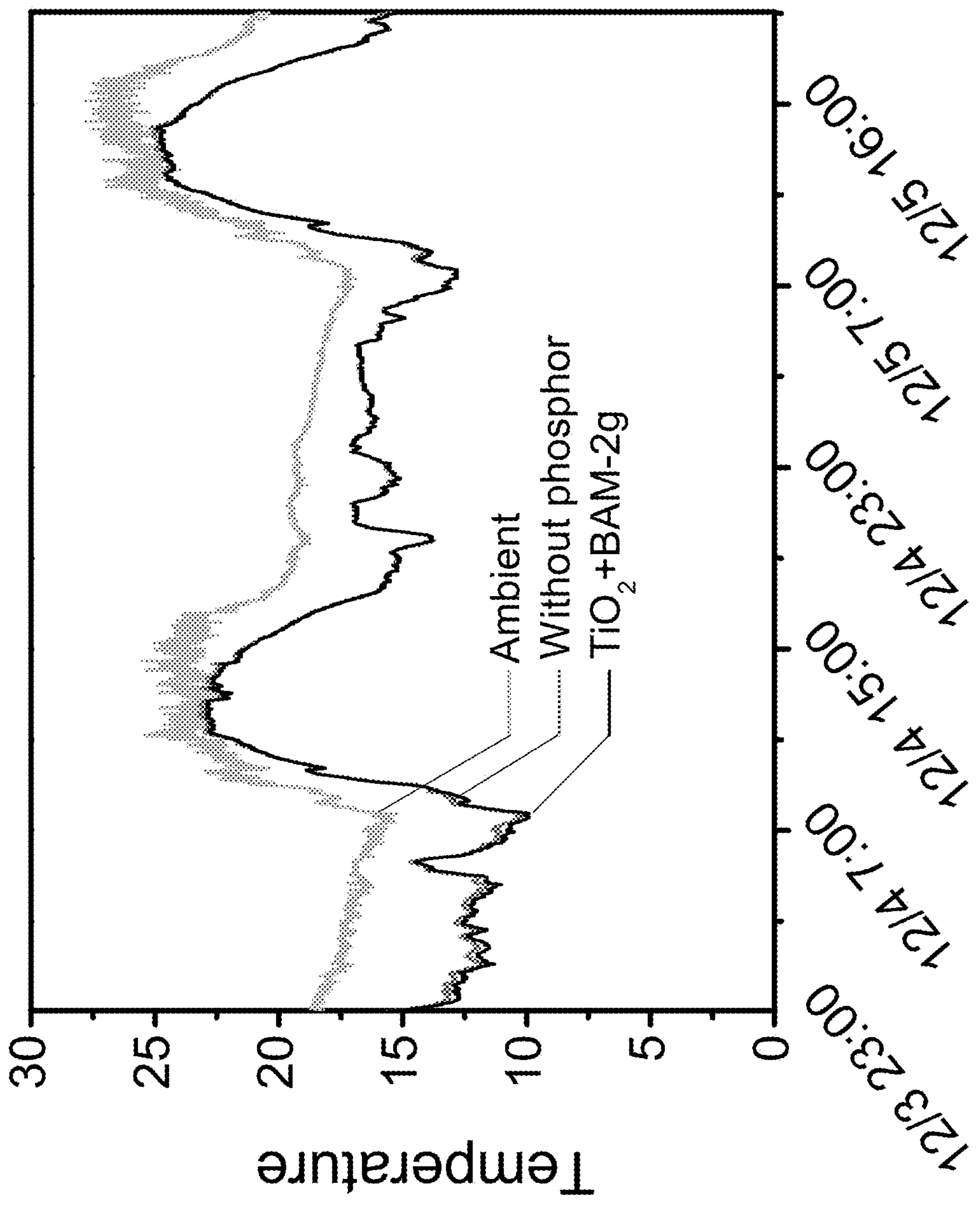
FIG. 17C is a plot showing the recorded temperature curves of ambient, white coating without phosphors, and the FERC coatings with BAM in sunny winter days in Hong Kong.
Figure 17D:
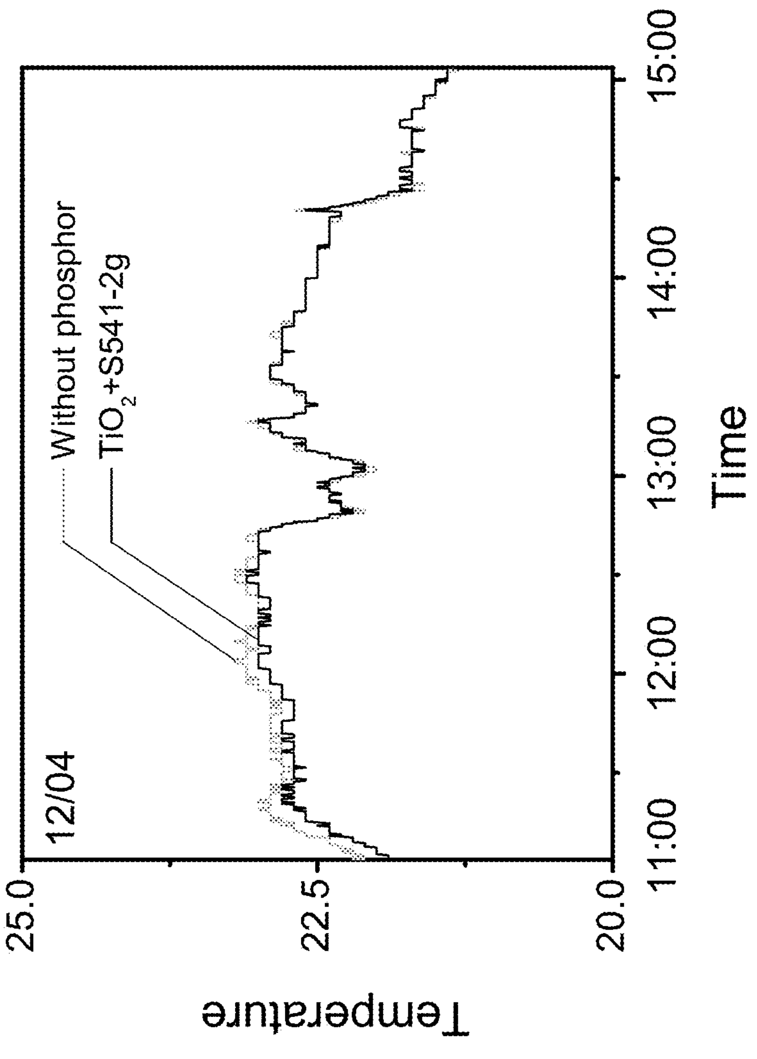
FIG. 17D is an enlarged view of FIG. 17B on 4 December.
Figure 17E:
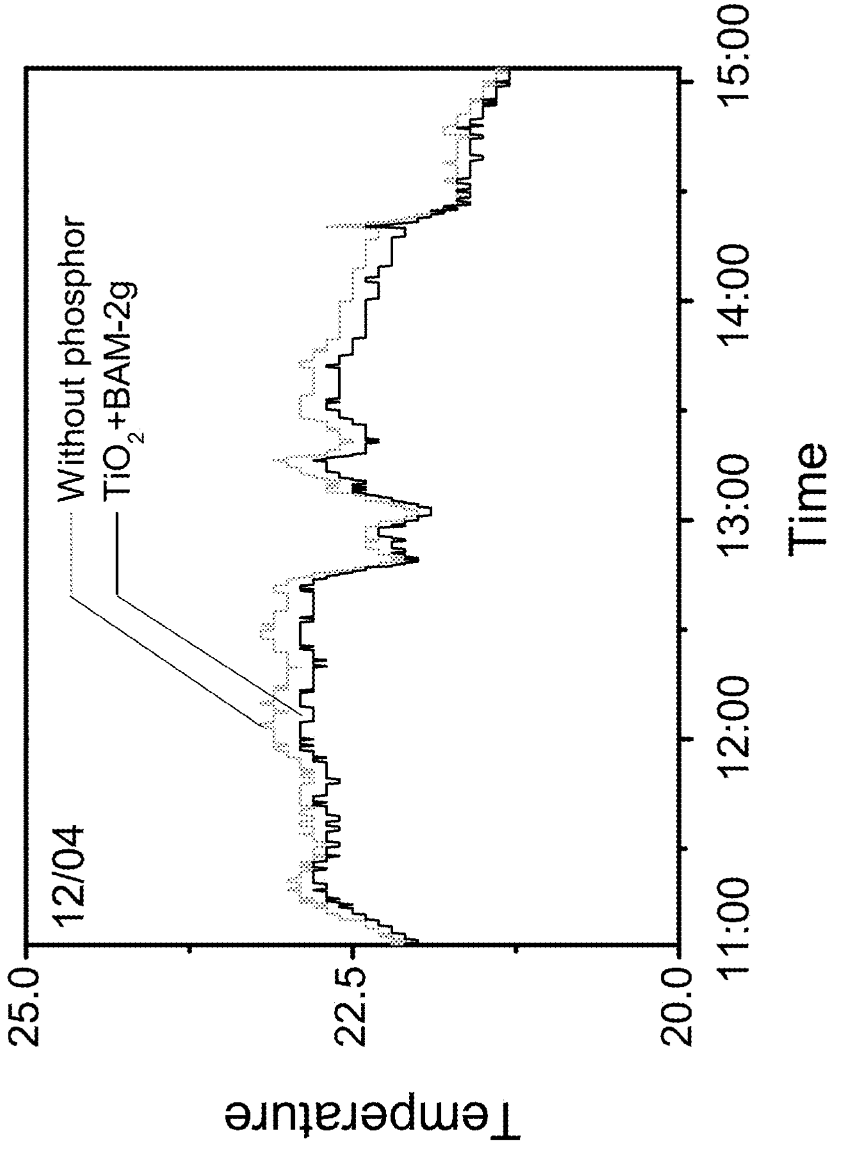
FIG. 17E is an enlarged view of FIG. 17C on 4 December.

A white coating without phosphor was prepared for comparison. To compare the effect of the two phosphors, same amount of phosphors was added into the white coating. The solar intensity and relative humidity during the test (3 December to 5 December) are shown in FIG. 17A. Referring to FIGS. 17B and 17C, and related 17D and 17E, respectively, all the coatings with or without phosphor could achieve obvious sub-ambient cooling during the daytime under typical winter clear sky in Hong Kong. As the solar intensity increases at noontime, smaller temperature reduction was observed, which is ascribed to solar absorption of $TiO_2$ NPs. Noteworthy, the coating added with BAM showed a lower temperature than that added with S541 under the same experimental conditions. It is believed that it may be due to S541 having a larger Stokes shift and less Purcell enhancement than BAM, leading to more energy from UV light being converted into heat.

Figure 18A:
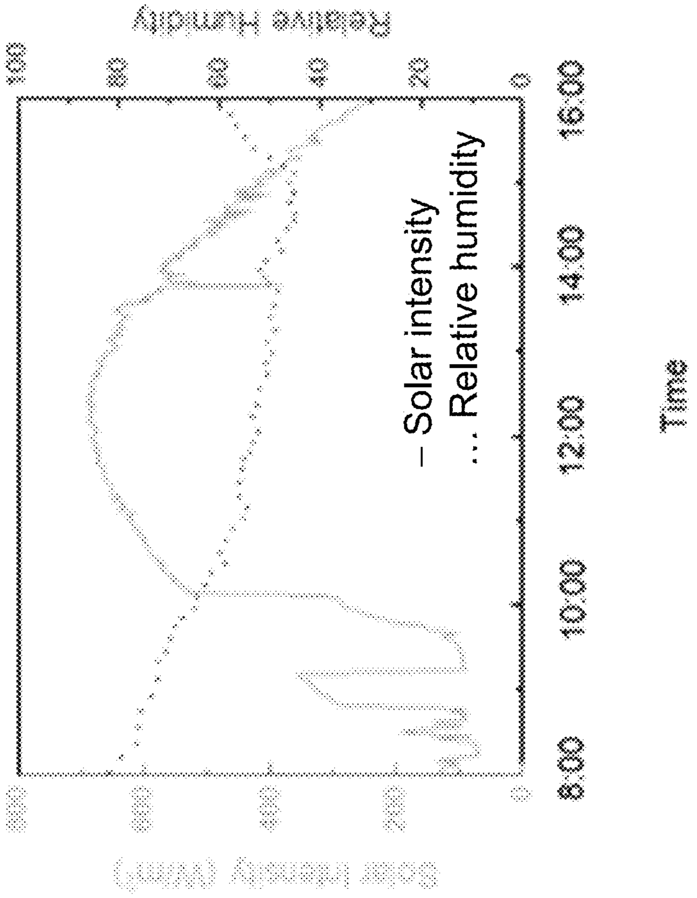
FIG. 18A is a plot showing the solar intensity and relative humidity during the field test on 12 December.
Figure 18B:
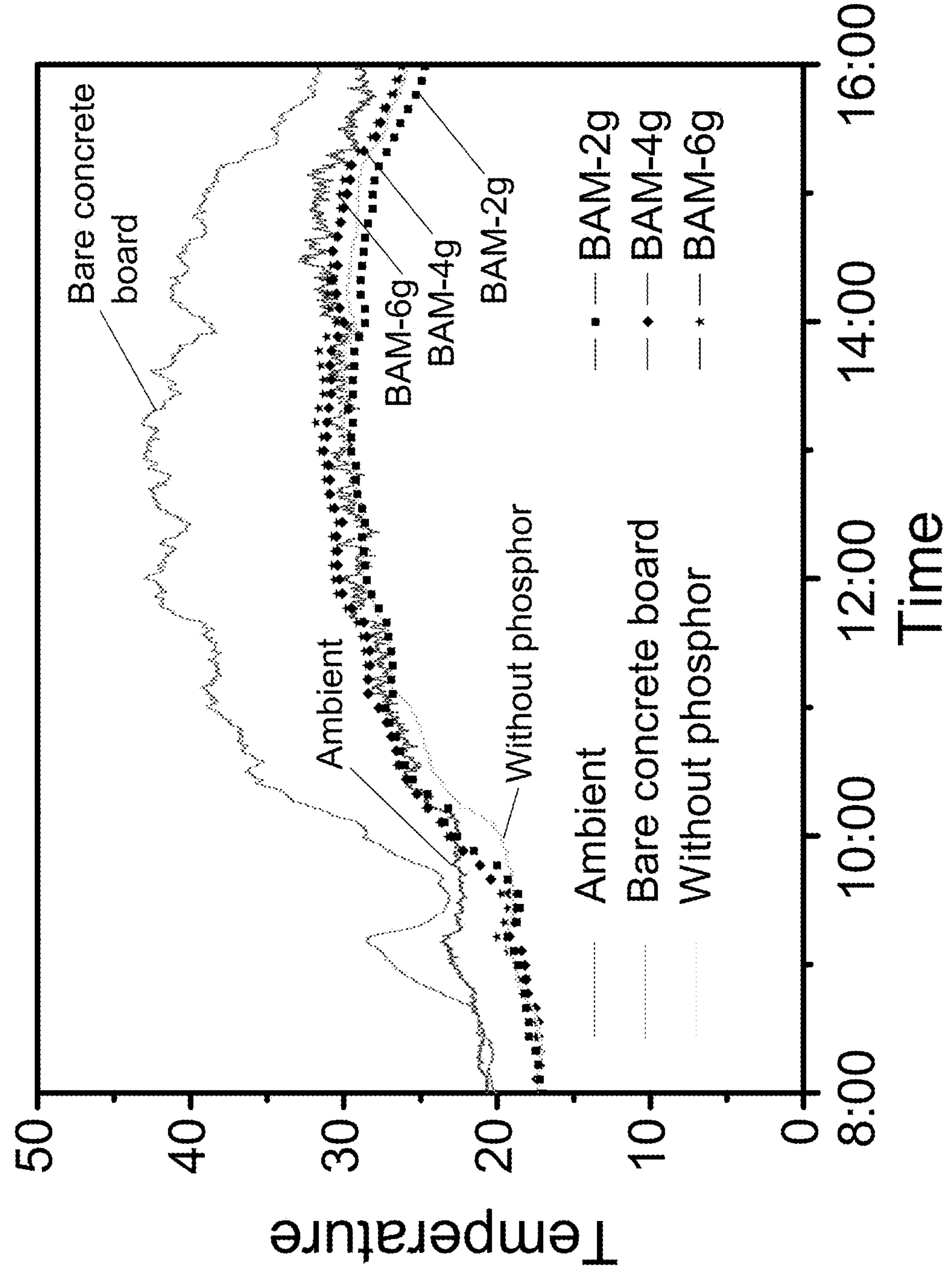
FIG. 18B is a plot showing the temperature change of ambient, white coating (without phosphor), bare cement board, and FERC coating with BAM of different concentrations during the field test on 12 December.
Figure 18C:
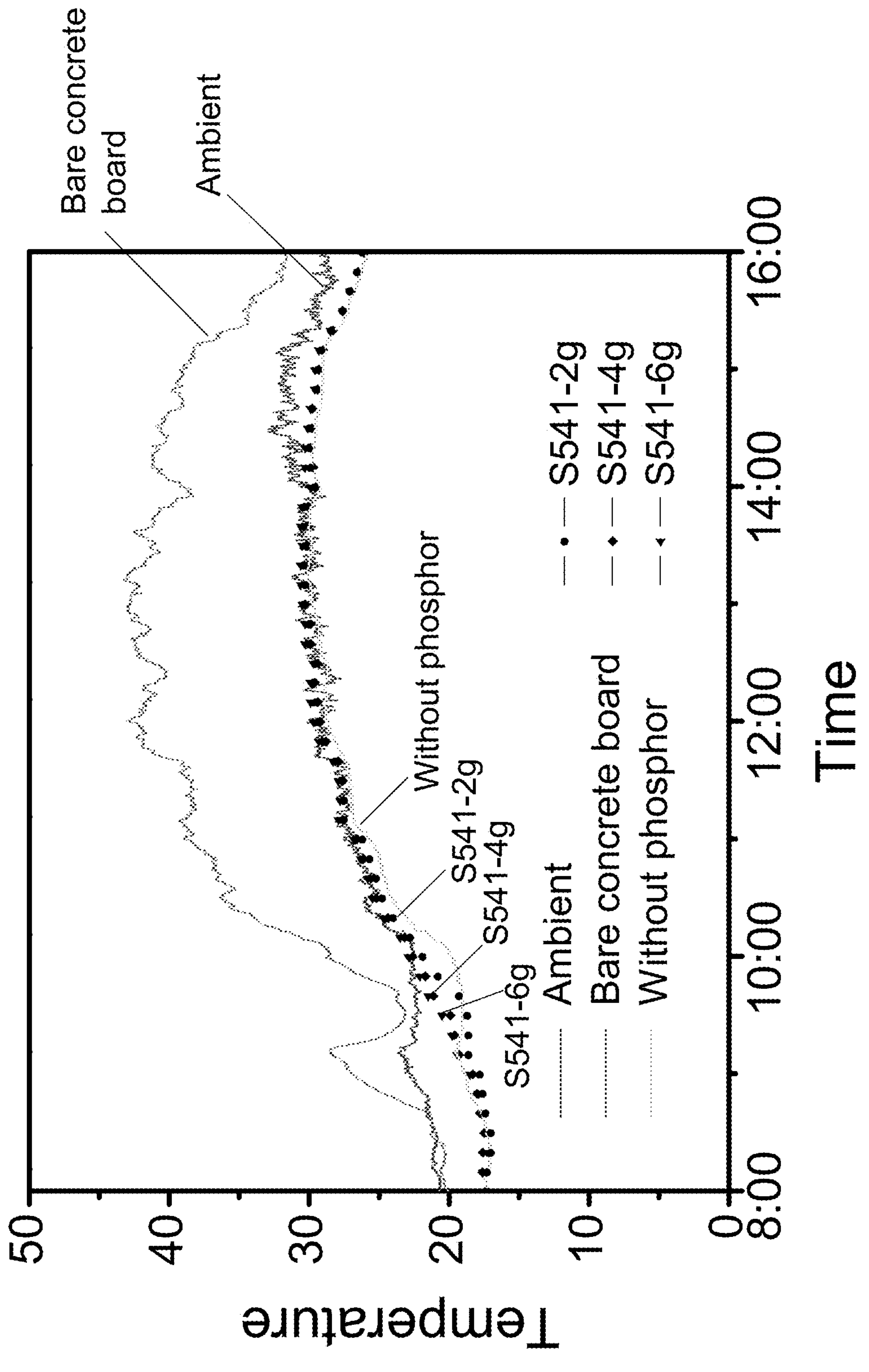
FIG. 18C is a plot showing the temperature change of ambient, white coating (without phosphor), bare cement board, and FERC coating with S541 of different concentrations during the field test on 12 December.
Figure 18D:
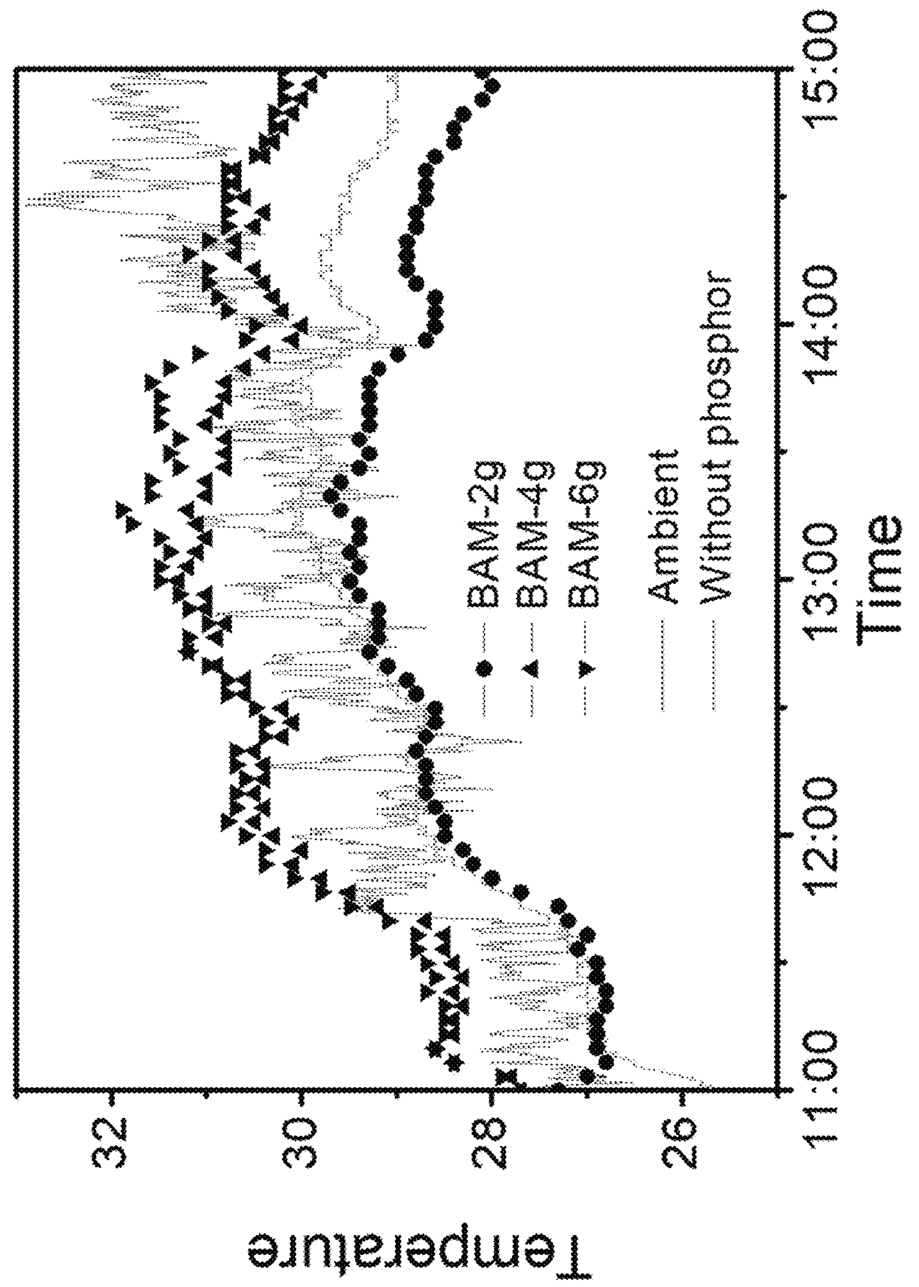
FIG. 18D is an enlarged view of FIG. 18B during the noontime.
Figure 18E:
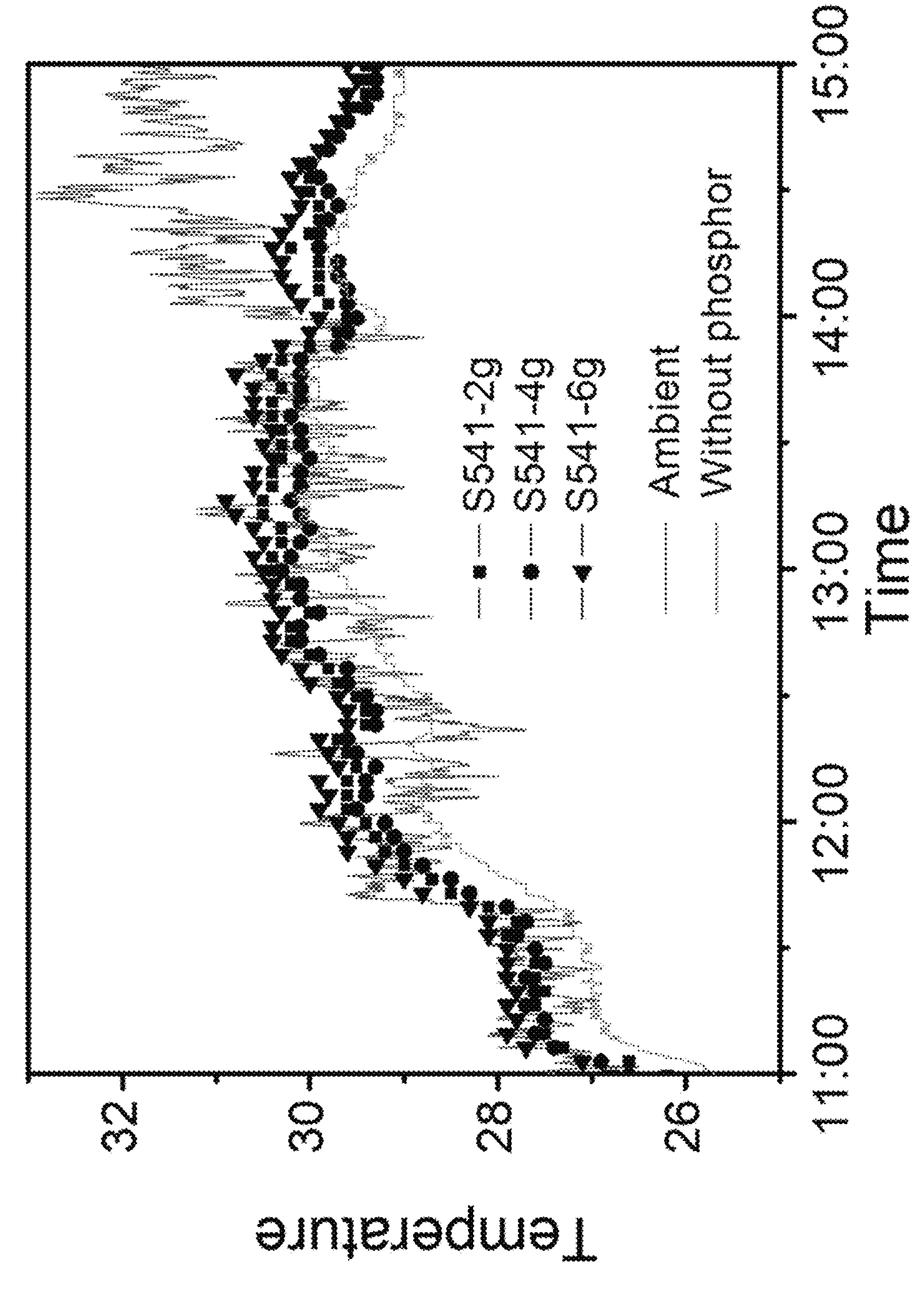
FIG. 18E is an enlarged view of FIG. 18C during the noontime.

Different amount of phosphors was added to the coating to investigate the effect on the cooling effect of the coating. The solar intensity and relative humidity during the test (12 December) are shown in FIG. 18A. Referring now to FIGS. 18B and 18C, the temperature of cement board coated with the FERC coating is about 15° C. lower than that of bare cement board. In particular, from the enlarged temperature changing curve shown in FIGS. 18D and 18E, the coating with 2 g BAM shows the best cooling performance, while the one with 2 g S541 shows a sub-ambient cooling only after 14:00. Other coatings with higher amount of phosphors show a temperature above ambient temperature during noontime (10:00-14:00). It is believed that the excessive amount of phosphor may introduce extra solar absorption through non-radiative recombination.

To quantify the impact of phosphors, effect solar reflectance (ESR) is evaluated by a calorimetric method. Based on standard linearization of long-wave radiative exchange and approximation on the radiative heat transfer coefficient, the surface temperature of the FERC coating can be expressed as:

$$T \cong \frac{\left[(1-ESR)I_{solar} + h_{non-rad}T_{amb} + h_{rad}T_{atm}\right]}{h_{non-rad} + h_{rad}} \tag{3}$$

where $I_{solar}$ is the solar intensity; $h_{rad}$ and $h_{non-rad}$ are radiative and non-radiative heat transfer coefficients, respectively; $T_{amb}$ and $T_{atm}$ are the temperature of ambient air and atmosphere, which can be regarded as the same in most cases. This equation can be further simplified by fitting a linear of the form:

$$T = a \cdot ESR + b \tag{4}$$

where a and b are environmental parameters at one certain circumstance, to obtain ESR when adequate reference samples are applied to equation (4).

Figure 19:
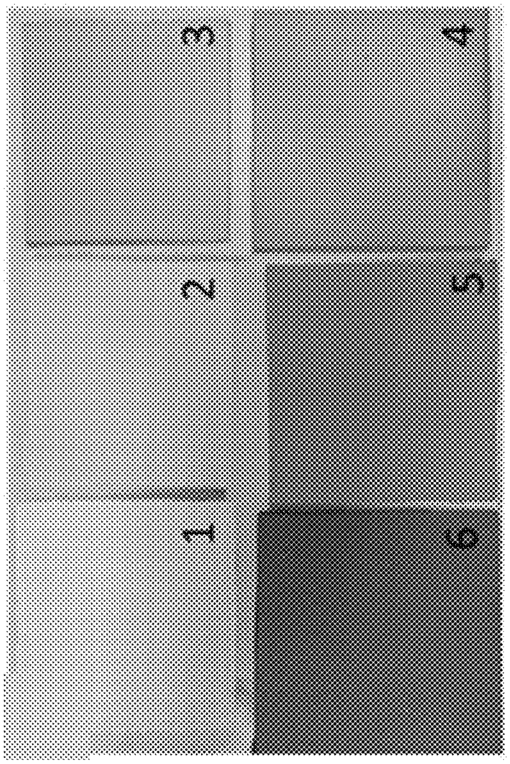
FIG. 19 is a photo showing the six reference samples based on white cooling coating (without phosphors), in which different concentrations of black pigment were added.
Figure 20A:
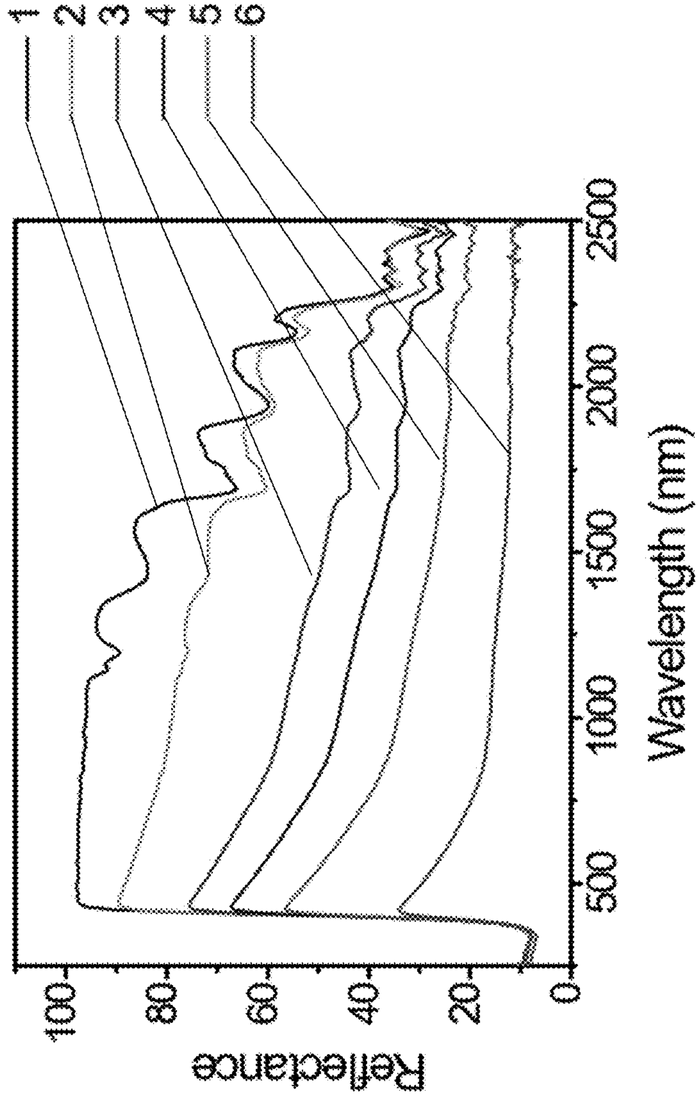
FIG. 20A is a plot showing the reflectance of the six reference coatings in FIG. 19.

In this work, six reference samples based on white cooling coating (without phosphors), in which different concentrations of black pigment were added (FIG. 19). All reference samples were sprayed on cement boards. The reflectance decreases with the increase of black pigment amount (FIGS. 20A and 20B).

Figure 21A:
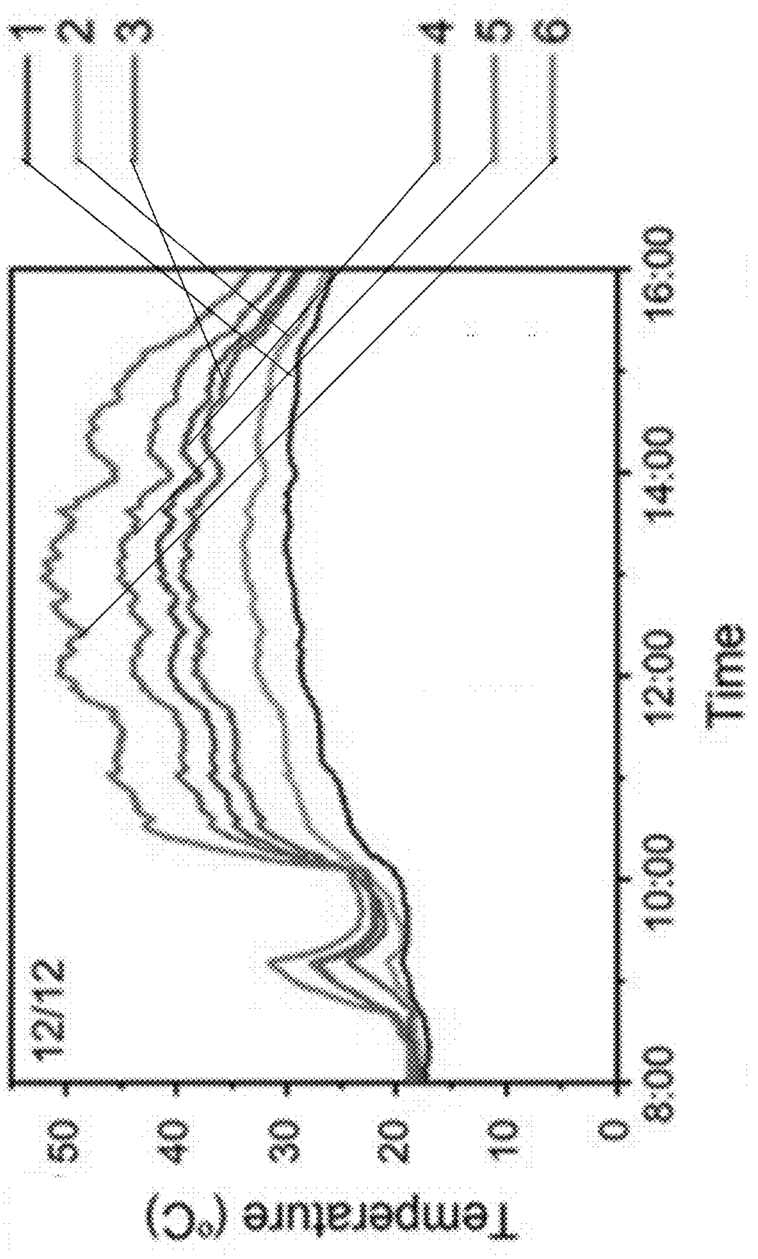
FIG. 21A is a plot showing the temperature change of the six reference coatings in FIG. 19 during the field test on 12 December.
Figure 21B:
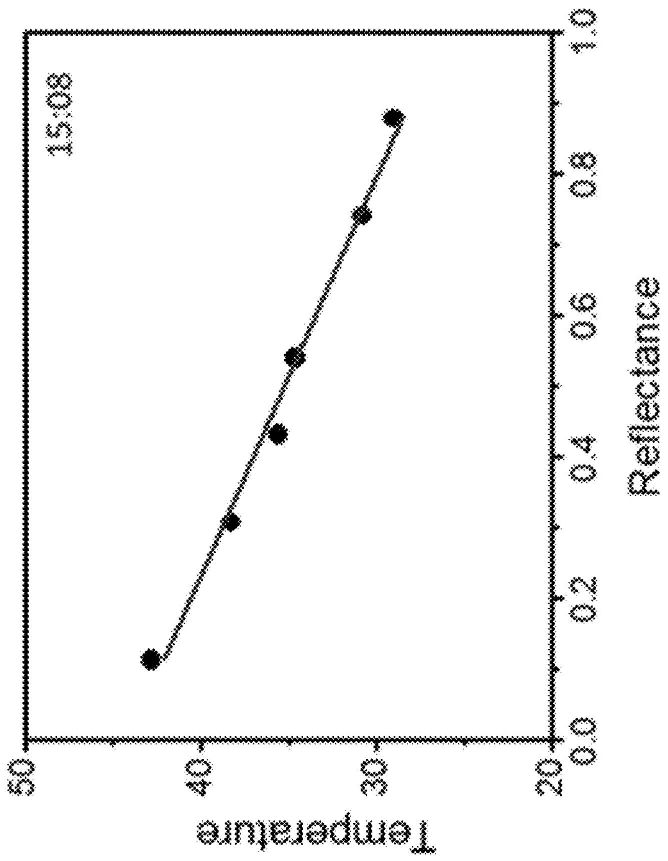
FIG. 21B is a plot showing the temperature fitting of the six reference coatings in FIG. 19.

To verify the relationship between their surface temperature and solar reflectance, all samples were placed under direct sunlight and the temperature was measured by using thermocouples. As shown in FIG. 21A, the samples with lower reflectance have a higher temperature after being exposed to sunlight. The temperature data were then fitted using equation (4). The temperature of reference coatings varies nearly linearly with the total solar reflectance (FIG. 21B). The simplified environmental parameters a and b can be extracted. Thus, the ESR of the FERC coatings can be obtained through the fitting results and temperature shown in FIGS. 18B and 18C.

Figure 22A:
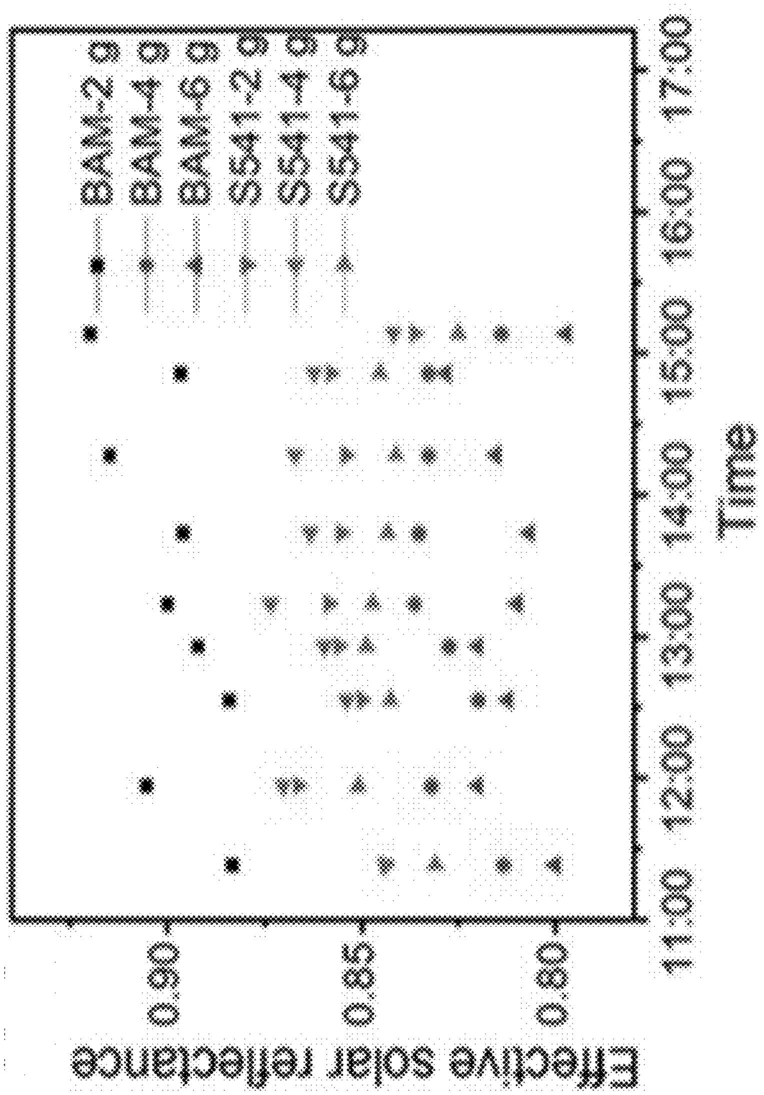
FIG. 22A is a plot showing the fitted ESR of six FERC coatings with different phosphors of different concentrations.

The fitted ESR for the six FERC coatings at noontime are shown in FIG. 22A. Interestingly, the ESR of the coatings with S541 phosphor or with a high concentration of BAM were found to be lower than 0.88. Only the coating with 2 g BAM exhibits an average ESR higher than 0.88, which is believed to be because of the moderate Stokes shift and high Purcell factor. Overall, an ESR improvement of about 0.04 (i.e., about 4%) is achieved.

Figure 22B:
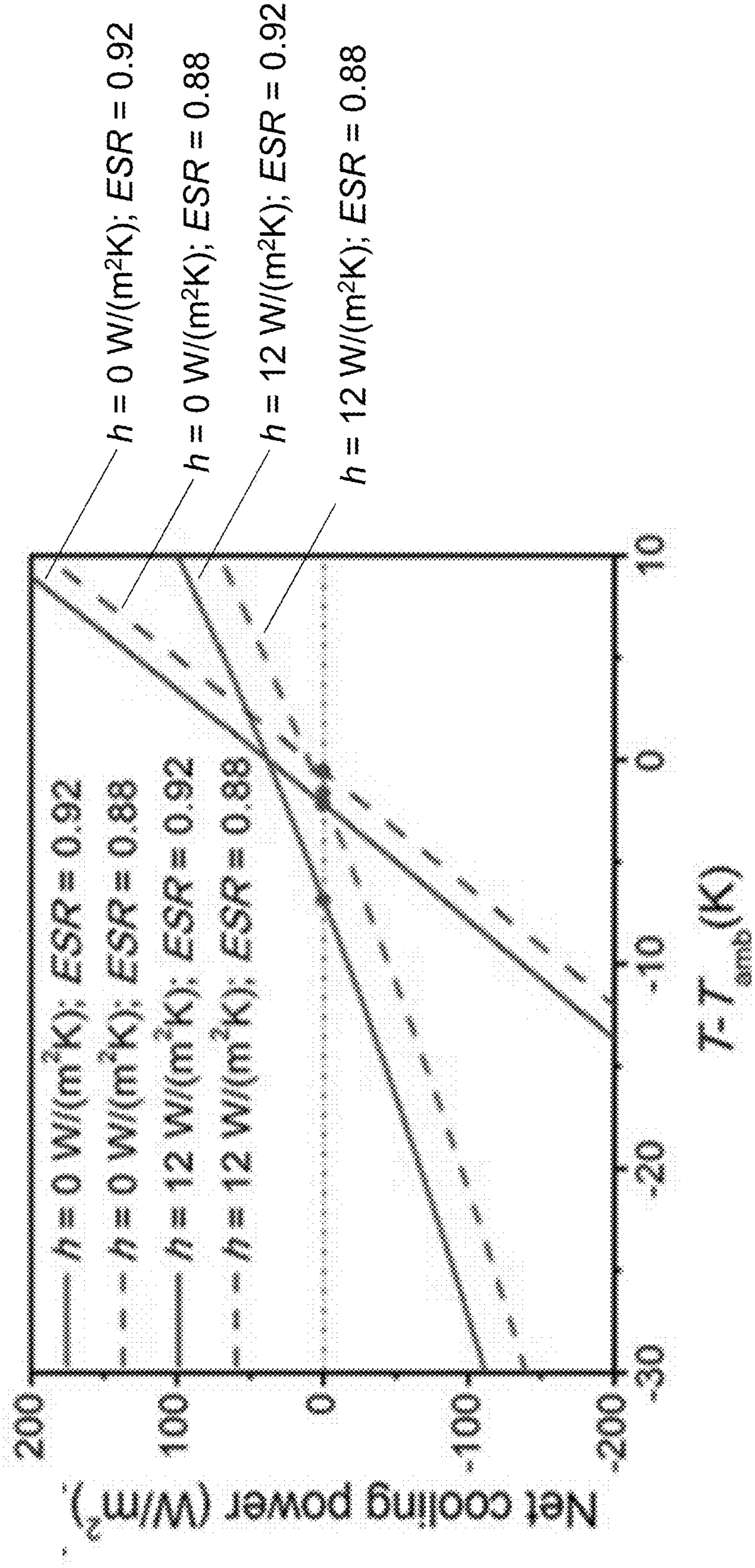
FIG. 22B is a plot showing the calculated net cooling power of coatings with different ESR values and non-radiative heat transfer coefficients h. The solar intensity, downward longwave radiation and coating emissivity for modelling were kept as 700 $W/m^2$, 360 $W/m^2$, and 0.95, respectively.

As shown in FIGS. 22B and 22C, although the large non-radiative heat transfer coefficient h causes the temperature reduction no obvious, the ESR improvement has facilitated the net cooling power of the coating to be improved by about 28 $W/m^2$ with respect to the white coating.

In sum, the higher ESR improvement of the BAM-based coating is believed to be because of its strong Purcell enhancement and high quantum yield (FIG. 4). It is also believed that by further tuning the Stokes shift of the phosphor, further improvement may be achieved.

It should be understood that the above only illustrates and describes examples whereby the present invention may be carried out, and that modifications and/or alterations may be made thereto without departing from the spirit of the invention.

It should also be understood that certain features of the invention, which are, for clarity, described in the context of separate embodiments, may also be provided in combination in a single embodiment. Conversely, various features of the invention which are, for brevity, described in the context of a single embodiment, may also be provided separately, or in any suitable subcombination.

All references specifically cited herein are hereby incorporated by reference in their entireties. However, the citation or incorporation of such a reference is not necessarily an admission as to its appropriateness, citability, and/or availability as prior art to/against the present invention.

What is claimed is:

1. A coating composition for reducing heat gain of an article, comprising:

TiO2 particles;

hollow glass microspheres;

phosphor material particles having a quantum yield of at least about 90% and an excitation wavelength range from about 250 nm to about 440 nm, said excitation wavelength range matching that of the TiO2 particles, thereby enhancing heat gain reduction of the coating composition; and a polymer matrix;

wherein the TiO2 particles have a weight percentage of about 10% wt to about 30% wt with respect to the coating composition; and the phosphor material particles are BaMgAl10O17:Eu2+, having a weight percentage of about 4% wt to about 8% wt with respect to the coating composition;

wherein the $TiO_2$ particles and the phosphor material particles are sized and formulated relative to each other such that the $TiO_2$ particles adhere to and assemble into a dielectric shell around the phosphor material particles, the coated phosphor material particles having a Purcell factor of about 2.6.

2. The coating composition as claimed in claim 1, wherein the phosphor material has a particle size of about 8 μm to about 15 μm.

3. The coating composition as claimed in claim 1, wherein the $TiO_2$ particles comprise a rutile crystal structure, an anatase crystal structure, or a mixture thereof.

4. The coating composition as claimed in claim 1, wherein the hollow glass microspheres comprise a coating selected from the group consisting of silver, nickel, zinc(II) oxide, TiO2 with anatase form, TiO2 with the rutile form, and a combination thereof.

5. The coating composition as claimed in claim 1, wherein the polymer matrix is selected from the group consisting of polystyrene, polyacrylate, polyalkylacrylate, polymethacrylate, polyalkylmethacrylate, polycarbonate, polyacryclic acid, polymethacrylic acid, and mixtures thereof, and copolymers thereof.

6. The coating composition as claimed in claim 1, wherein the polymer matrix is polystyrene acrylic emulsion polymer.

7. The coating composition as claimed in claim 1, wherein the polymer matrix has a weight percentage of about 45% wt to about 60% wt with respect to the coating composition.

8. The coating composition as claimed in claim 1, wherein the coating composition, when applied on the article, reduces the heat gain of the article by at least about 15° C.

9. The coating composition as claimed in claim 1, wherein the coating composition has an enhanced net cooling power by about 28 W/m2 caused by the presence of phosphor material.

10. The coating composition as claimed in claim 1, wherein the article comprises infrastructure, clothing, or an automobile.

11. The coating composition as claimed in claim 1, further comprising a wetting agent, a dispersant agent, an antifoaming agent, a suspending agent, a levelling agent, a film-forming agent, water, or a mixture thereof.

12. A method for reducing heat gain of an article by using the coating composition as claimed in claim 1, comprising the steps of:

a) providing a mixture comprising the coating composition as claimed in claim 1 and one or more additives; and b) applying the mixture on a surface of the article thereby forming a layer of coating thereon.

13. The method as claimed in claim 12, wherein the one or more additives comprises a wetting agent, a dispersant agent, an antifoaming agent, a suspending agent, a levelling agent, a film-forming agent, water, or a mixture thereof.

14. The method as claimed in claim 12, wherein step b) comprises a step of spraying the mixture on the surface of the article at a predefined pressure.

* * * * *